US012261991B2

(12) United States Patent
Newman

(10) Patent No.: US 12,261,991 B2
(45) Date of Patent: Mar. 25, 2025

(54) SYSTEMS AND METHODS FOR GENERATING AND/OR USING 3-DIMENSIONAL INFORMATION WITH CAMERA ARRAYS

(71) Applicant: Visionary Machines Pty Ltd, Hornsby (AU)

(72) Inventor: Rhys Andrew Newman, Hornsby (AU)

(73) Assignee: Visionary Machines Pty Ltd, Hornsby (AU)

( * ) Notice: Subject to any disclaimer, the term of this patent is extended or adjusted under 35 U.S.C. 154(b) by 170 days.

(21) Appl. No.: 17/920,896

(22) PCT Filed: Apr. 23, 2021

(86) PCT No.: PCT/AU2021/050374
§ 371 (c)(1),
(2) Date: Oct. 24, 2022

(87) PCT Pub. No.: WO2021/212187
PCT Pub. Date: Oct. 28, 2021

(65) Prior Publication Data
US 2023/0188696 A1     Jun. 15, 2023

Related U.S. Application Data

(60) Provisional application No. 63/015,111, filed on Apr. 24, 2020.

(30) Foreign Application Priority Data

Apr. 24, 2020 (AU) ................................ 2020901307

(51) Int. Cl.
*H04N 13/243*     (2018.01)
*G01J 3/28*     (2006.01)
(Continued)

(52) U.S. Cl.
CPC ........... *H04N 13/243* (2018.05); *G06T 7/292* (2017.01); *H04N 13/246* (2018.05);
(Continued)

(58) Field of Classification Search
CPC .... H04N 13/243; H04N 13/246; G06T 7/292; G06T 2202/10012; G06T 2207/30252; G01J 2003/2826
See application file for complete search history.

(56) References Cited

U.S. PATENT DOCUMENTS 8,081,244 B2   12/2011   Golub et al.
8,922,636 B1   12/2014   Belden et al.
(Continued)

FOREIGN PATENT DOCUMENTS

JP     2011149952 A     8/2011
WO    2009039367 A1    3/2009
(Continued)

OTHER PUBLICATIONS

EP21793321.7, "Extended European Search Report", Mar. 19, 2024, 8 pages.
(Continued)

*Primary Examiner* — Rowina J Cattungal
(74) *Attorney, Agent, or Firm* — Kilpatrick Townsend & Stockton LLP

(57) ABSTRACT

The present disclosure is directed to devices, systems and/or methods that may be used for determining scene information from a real-life scene using data obtained at least in part from a camera array. Exemplary systems may be configured to generate three-dimensional information in real-time or substantially real time and may be used to estimate velocity of one or more physical surfaces in a real-life scene.

22 Claims, 18 Drawing Sheets

(51) Int. Cl.
*G06T 7/292* (2017.01)
*H04N 13/246* (2018.01)

(52) U.S. Cl.
CPC ............... *G01J 2003/2826* (2013.01); *G06T 2207/10012* (2013.01); *G06T 2207/30252* (2013.01)

(56) References Cited

U.S. PATENT DOCUMENTS

| | | | |
|---|---|---|---|
| 10,957,074 B2* | 3/2021 | Deng | G06T 7/70 |
| 2001/0005204 A1 | 6/2001 | Matsumoto et al. | |
| 2012/0013749 A1 | 1/2012 | Oberdoerster et al. | |
| 2014/0092217 A1 | 4/2014 | Tanner | |
| 2014/0205270 A1 | 7/2014 | Kelly et al. | |
| 2014/0321712 A1 | 10/2014 | Ciurea et al. | |
| 2015/0116597 A1 | 4/2015 | Chandraker et al. | |
| 2018/0180733 A1 | 6/2018 | Smits | |
| 2018/0192033 A1* | 7/2018 | Gallup | H04N 23/90 |
| 2019/0035148 A1* | 1/2019 | Owechko | G06T 17/20 |
| 2019/0311546 A1 | 10/2019 | Tay et al. | |
| 2019/0371051 A1* | 12/2019 | Dore | G06T 7/90 |
| 2022/0005276 A1* | 1/2022 | Morisawa | G06T 15/20 |

FOREIGN PATENT DOCUMENTS

| | | |
|---|---|---|
| WO | 2019116942 A1 | 6/2019 |
| WO | 2019157344 A1 | 8/2019 |

OTHER PUBLICATIONS

PCT/AU2021/050374, "International Preliminary Report on Patentability", Nov. 3, 2022, 6 pages.
PCT/AU2021/050374, "International Search Report and Written Opinion", Jun. 15, 2021, 9 pages.
International-type Search for Provisional Patent Application (AU2019904127), prepared by IP Australia; Jan. 1, 2020.
International-type Search for Provisional Patent Application (AU 2020901307), prepared by IP Australia, dated June 9, 2 2020.

* cited by examiner

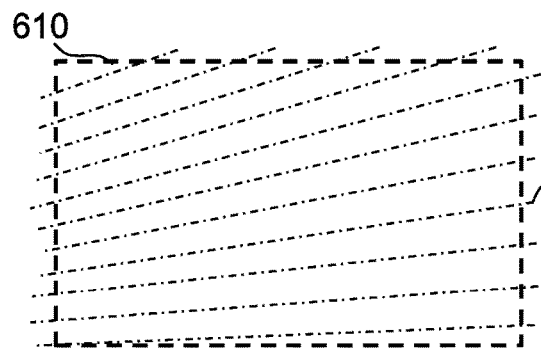
FIG. 6 A
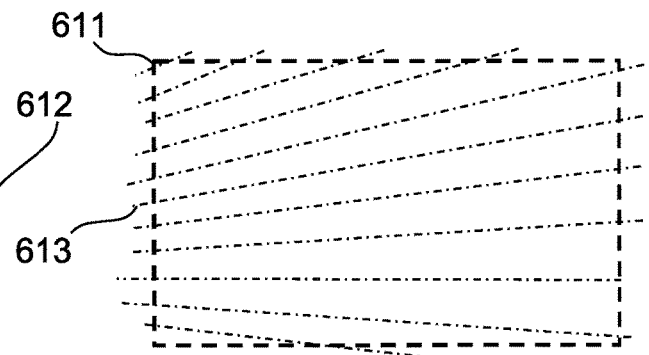
FIG. 6 B
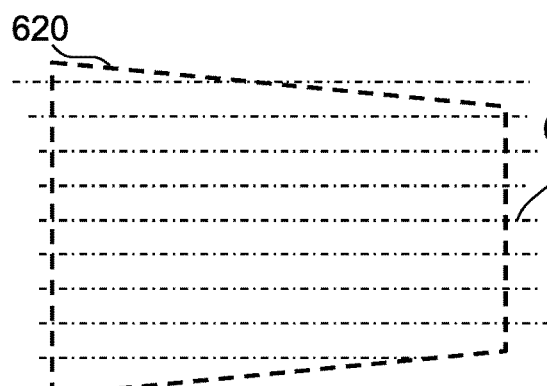
FIG. 6 C
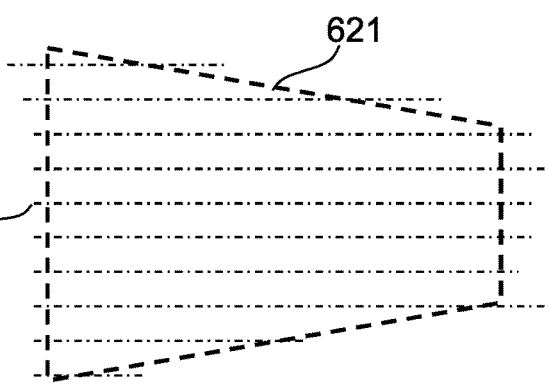
FIG. 6 D
FIG. 6

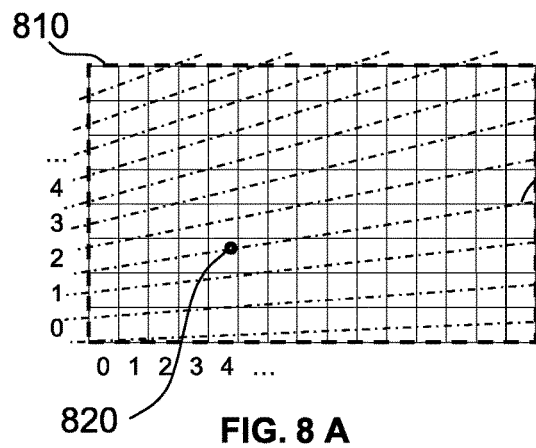
FIG. 8 A
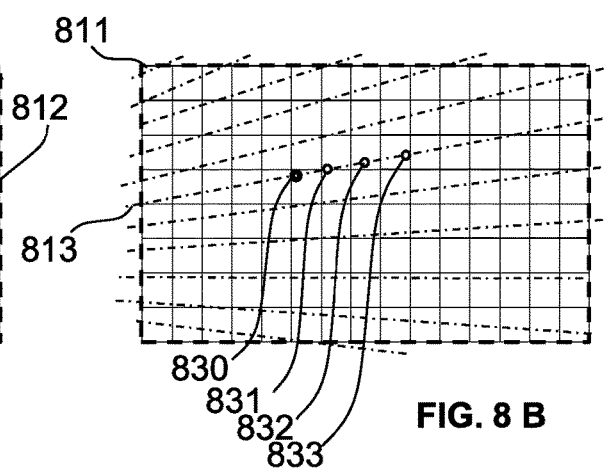
FIG. 8 B
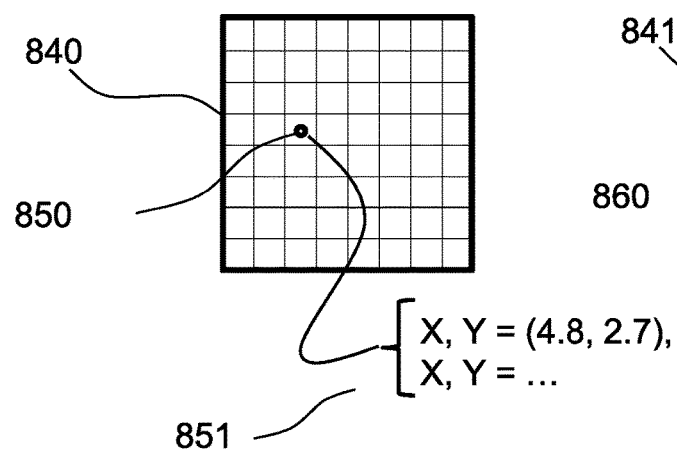
X, Y = (4.8, 2.7),
X, Y = ...
FIG. 8 C
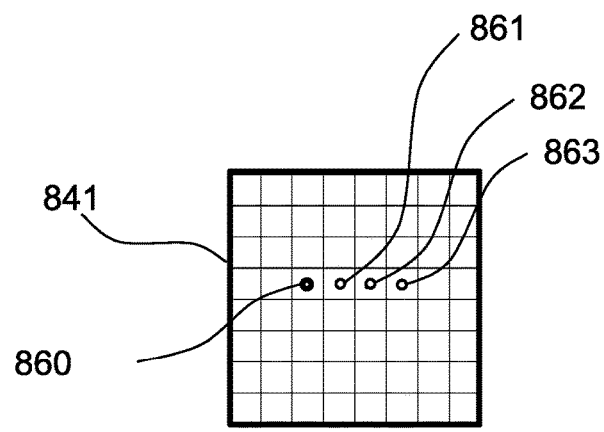
FIG. 8 D
FIG. 8

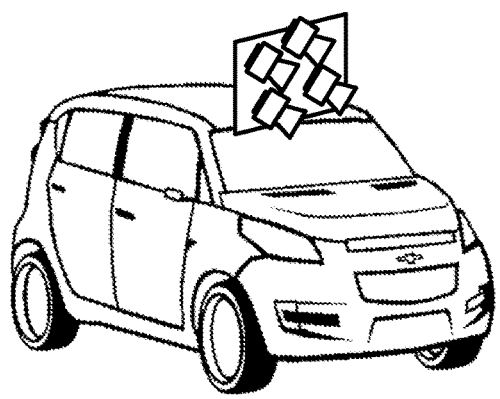
FIG. 11 A
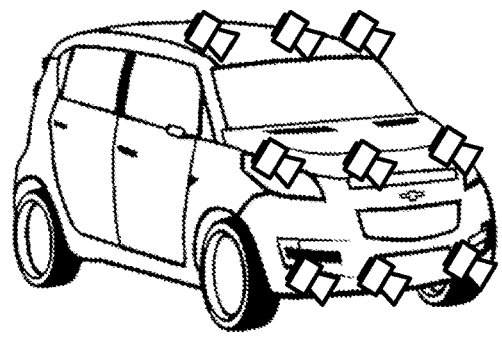
FIG. 11 B
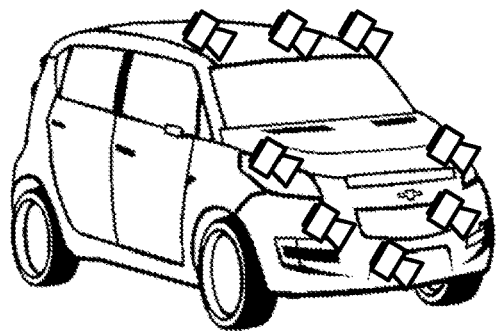
FIG. 11 C
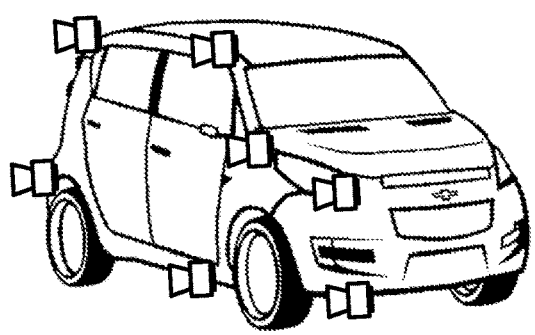
FIG. 11 D
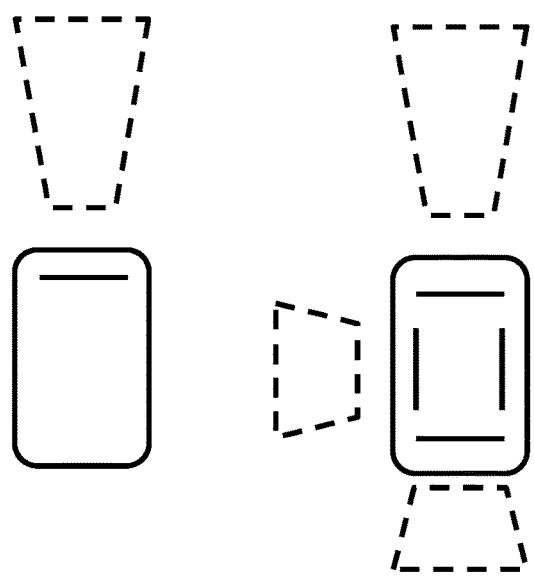
FIG. 11 E
FIG. 11 F
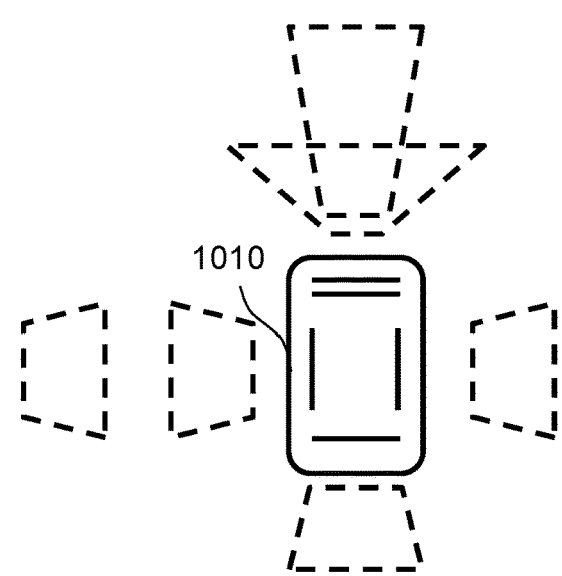
FIG. 11 G

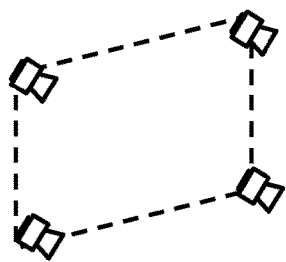
FIG. 12 A
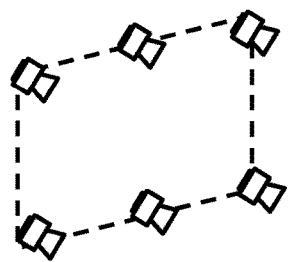
FIG. 12 B
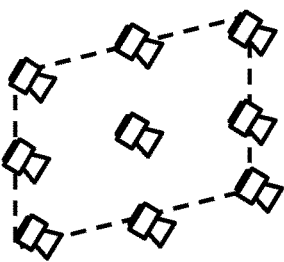
FIG. 12 C
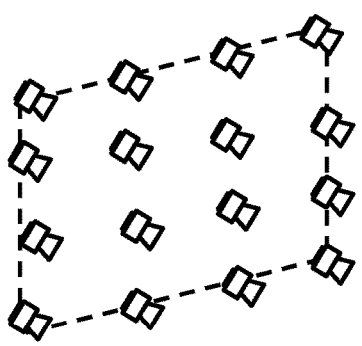
FIG. 12 D
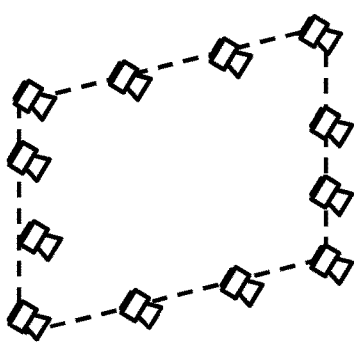
FIG. 12 E
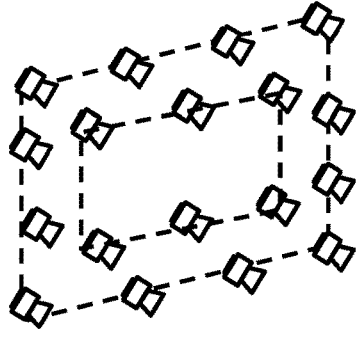
FIG. 12 F
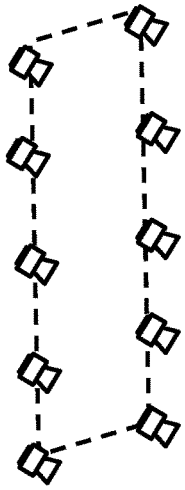
FIG. 12 G
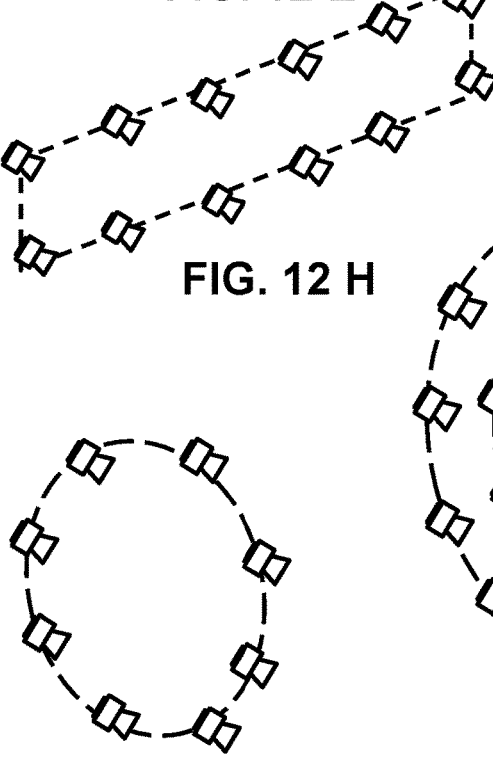
FIG. 12 H
FIG. 12 I
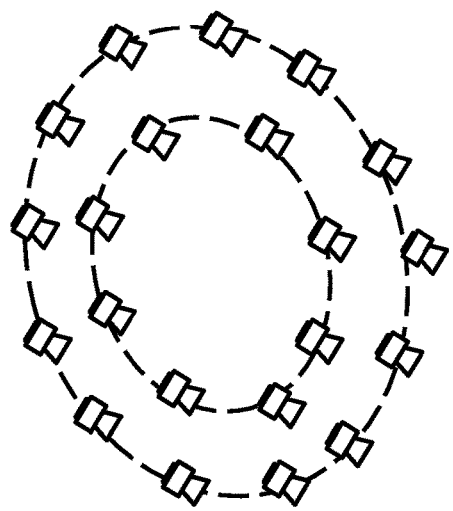
FIG. 12 J

| Camera Pairs |
|---|
| (1,2), (1,3), (1,4) |
| (2,1), (2,3), (2,4) |
| (3,1), (3, 2), (3,4) |
| (4,1), (4,2), (4,3) |

SYSTEMS AND METHODS FOR GENERATING AND/OR USING 3-DIMENSIONAL INFORMATION WITH CAMERA ARRAYS

CROSS-REFERENCE

This application claims priority to U.S. Provisional Application Ser. No. 63/015,111, entitled Systems and Methods for Generating and/or Using 3-Dimensional Information with Camera Arrays, filed Apr. 24, 2020; and to Australian Provisional Application No. 2020901307, entitled, Systems and Methods for Generating and/or Using 3-Dimensional Information with Camera Arrays, filed on Apr. 24, 2020. Each of these applications are herein incorporated by reference in their entirety.

FIELD

The present disclosure relates generally to devices, systems and/or methods that may be used for determining scene information using data obtained at least in part from a camera array. That scene information may be 3D information.

BACKGROUND

Scene information about the 3D environment is useful for many applications including, for example, the safe autonomous driving of vehicles on conventional roads and highways, and for example for navigation, surveying, environmental monitoring, crop monitoring, mine surveying, and checking the integrity of built structures.

One way of creating such scene information is with devices that use one or more lasers, potentially strobing to cover a scene, to emit pulses of light and by measuring the time delay to receive reflected pulses determine the distances of surfaces in the 3D scene from the laser source—such devices are commonly termed LiDAR. This approach has a number of drawbacks, for example: (1) it is difficult to achieve lateral accuracy at long range (angular resolution is fixed and therefore errors grow with distance); (2) the laser pulses potentially interfere when there are many active lasers in an environment (a common case in traffic filled with LiDAR equipped vehicles); (3) the returned pulses require reasonable reflectivity from the target physical surface in the response direction, and (4) rain, dust and snow cause difficulties by cluttering the scene with potential multiple reflections that break the assumption that the light pulses travel to a target and back in a straight line. Further, LiDAR does not capture the visual appearance (typically contained in the Red-Green-Blue (RGB) part of the visual electromagnetic spectrum) of the target physical surface, thereby limiting some processing and analysis.

Another way to create 3D scene information is to use radar. However, radar is more limited in angular resolution than LiDAR, and reflections are more dependent on target physical surface characteristics; e.g., metal reflects well but human bodies absorb most of the radar signal.

Optical camera systems may be used, with appropriate processing, to generate 3D scene information. Binocular cameras, capturing pairs of images may be used to derive 3D scene information, in particular, depth information, based on binocular disparity (i.e., the difference between the positions in two images of a fixed feature in the scene). Typically, binocular disparity methods match local regions in image pairs captured by cameras that have a known physical separation or baseline. From the disparity, a depth for the matched region may be determined based on optical (the assumption that light travels in straight lines) and geometric triangulation principles. Binocular disparity methods are prone to error in plain regions where there is little or no texture for identifying accurate matches between the two separate views. Binocular disparity methods also suffer from ambiguity around objects whose parts are occluded from one or both cameras.

Optical camera systems, using more than two cameras in concert to view a scene from different positions, are known in the art; these systems are often simply referred to as camera arrays. These arrays capture a set of 2D images of the scene from multiple different directions and/or positions. Depth information may then be obtained using similar principles to the binocular camera, based on the disparity of local image regions matched between pairs of images from different cameras in the camera array. One implementation of a camera array system is the micro-lens array; i.e., an array of small lenses set in a fixed grid positioned in front of miniature individual camera sensors. However, the baseline between camera pairs in such an array is typically constrained by the size and resolution of the fabrication process, limiting the depth and angular (spatial) resolution accuracy. Another type of camera array is where the cameras are arranged on a single plane, often with a common orientation too, to facilitate simplified calculations of disparity. However, such limitations on the physical arrangement of cameras in a camera system may limit the practical design of a camera array in certain applications, particularly where a large baseline is required.

Previous camera arrays may generate large volumes of data that must be then managed (often millions of pixel values per camera) which require significant computational resources to determine accurate depth and other desired scene information. In one approach the mapping between sample points in a three-dimensional space and their appearance for each camera may need to be determined for each camera in the camera array. The number of such sample points may be very large if required to cover a substantial portion of the scene at a high resolution. The mapping between the sample points in the scene and pixels in the image data from the cameras in the camera array conventionally requires a large amount of computational resources. When multiplied by the number of cameras in the array the total computational effort may become infeasible. Consequently, such systems often operate with a constrained resolution or with limited frame rate. It might be thought that the mapping between the sample points and the pixels in the image data may be precomputed (i.e., once during manufacturing or once at system start time) to save computational effort. However, in this case the number of parameters that must be stored and then applied to transform the image data may be large and therefore impractical. In either case the high computation or the high number of parameters make it difficult to construct a system that may deliver accurate, high resolution 3D scene information at suitable real time frame rates.

The present disclosure is directed to overcome and/or ameliorate at least one or more of the disadvantages of the prior art, as will become apparent from the discussion herein. The present disclosure also provides other advantages and/or improvements as discussed herein.

SUMMARY OF THE DISCLOSURE

Certain embodiments are to devices, systems and/or methods that may be used for determining scene information using data obtained at least in part from a camera array. That scene information may be 3D information.

In certain embodiments, the system may be configured to generate three-dimensional information in real-time or substantially real time.

In certain embodiments, the system may be configured to generate three-dimensional information at real-time frame rates or substantially real-time frame rates.

Certain embodiments are to methods for generating three-dimensional video information using one or more of the exemplary disclosed systems.

Certain embodiments are directed to systems that may be used to estimate velocity for the physical surface in a real-life scene.

Certain embodiments are directed to a system for generating three-dimensional information of a real-life scene comprising: a camera array made up of a plurality of cameras, the camera array configured to be positioned to view the real-life scene; the plurality of cameras comprising: at least a first camera that is configured to collect spectral data from a first field of view of the real-life scene; at least a second camera that is configured to collect spectral data from a second field of view of the real-life scene; at least a third camera that is configured to collect spectral data from a third field of view of the real-life scene; and at least a fourth camera that is configured to collect spectral data from a fourth field of view of the real-life scene; the first camera configured to generate at least a first image from the first field of view; the second camera configured to generate at least a second image from the second field of view; the third camera configured to generate at least a third image from the third field of view; and the fourth camera configured to generate at least a fourth image from the fourth field of view; the camera array being configured to transmit the first image, the second image, the third image, and the fourth image to a processing engine; and the processing engine is configured to: obtain image data from the plurality of cameras including the first camera, the second camera, the third camera, and the fourth camera; generate a representation of a 3D volume representative at least in part of a portion of the real-life scene by extracting associated pixel data that is selected from at least a substantial portion of the pixel data based on the projection of the 3D volume in at least one of the camera images; and using the associated pixel data to determine the likelihood that the 3D volume contains a physical surface.

Certain embodiments are to methods of using the systems disclosed herein.

BRIEF DESCRIPTION OF DRAWINGS

FIG. 6 is an illustration of an epipolar rectification for a camera pair.

FIG. 8 is an illustration of a pair of warps in relation to a pair of source images.

FIG. 11 is an illustration of further exemplary camera configurations, according to certain embodiments.

FIG. 12 is an illustration of exemplary camera array configurations, according to certain embodiments.

DETAILED DESCRIPTION

Figure 1:
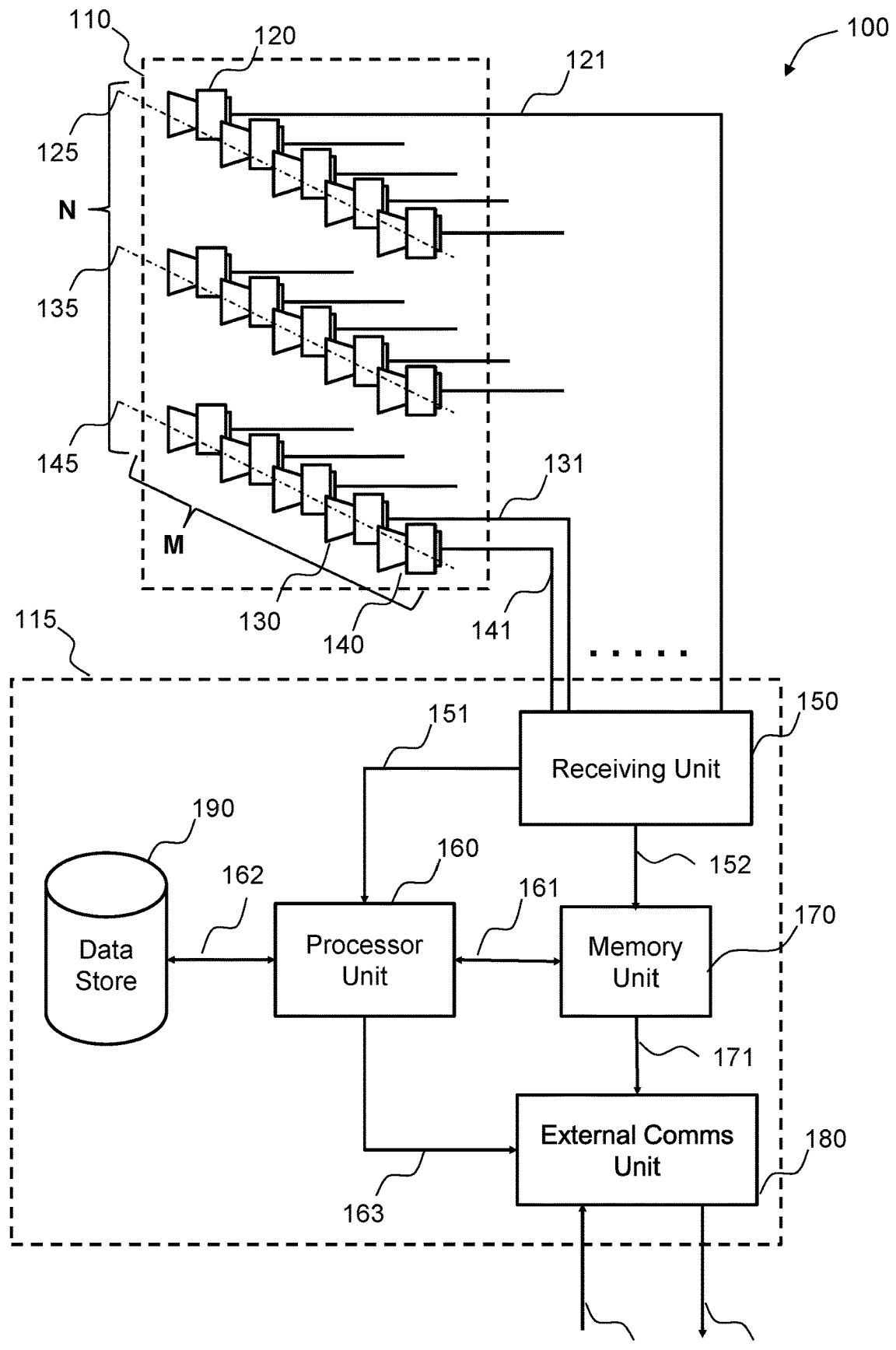
FIG. 1 is a top-level system diagram for creating a 3-dimensional representation of a scene, including a camera array and a processing engine, according to certain embodiments.

The following description is provided in relation to several embodiments that may share common characteristics and features. It is to be understood that one or more features of one embodiment may be combined with one or more features of other embodiments. In addition, a single feature or combination of features in certain of the embodiments may constitute additional embodiments. Specific structural and functional details disclosed herein are not to be interpreted as limiting, but merely as a representative basis for teaching one skilled in the art to variously employ the disclosed embodiments and variations of those embodiments.

The subject headings used in the detailed description are included only for the ease of reference of the reader and should not be used to limit the subject matter found throughout the disclosure or the claims. The subject headings should not be used in construing the scope of the claims or the claim limitations.

Certain embodiments of this disclosure may be useful in a number of areas. For example, one or more of the following non-limiting exemplary applications: off-road vehicle (e.g., cars, buses, motorcycles, trucks, tractors, forklifts, cranes, backhoes, bulldozers); road vehicles (e.g., cars, buses, motorcycles, trucks); rail based vehicles (e.g., locomotives); air based vehicles (e.g., airplanes, drones), space based vehicles (e.g., satellites, or constellations of satellites); individuals (e.g., miners), amphibious vehicles (e.g., boats, cars, buses); and watercraft (e.g., ships boats, hovercraft, submarines). In addition, the non-limiting exemplary applications may be operator driven, semi-autonomous and/or autonomous.

The term "scene" means a subset of the three dimensional real-world (i.e., 3D physical reality) as perceived through the field of view of one or more cameras. In certain embodiments, there may be at least 2, 3, 4, 5, 10, 15, 20, 25, 30, 35 or 40, 100, 1000, or more cameras.

The term "object" means an element in a scene. For example, a scene may include one or more of the following objects: a person, a child, a car, a truck, a crane, a mining truck, a bus, a train, a motorcycle, a wheel, a patch of grass, a bush, a tree, a branch, a leaf, a rock, a hill, a cliff, a river, a road, a marking on the road, a depression in a road surface, a snow flake, a house, an office building, an industrial building, a tower, a bridge, an aqueduct, a bird, a flying bird, a runway, an airplane, a helicopter, door, a door knob, a shelf, a storage rack, a fork lift, a box, a building, an airfield, a town or city, a river, a mountain range, a field, a jungle, and a container. An object may be a moving element or may be stationary or substantially stationary. An object may be considered to be in a background or a foreground.

The term "physical surface" means the surface of an object in a scene that emits and/or reflects electromagnetic signals in at least one portion of the electromagnetic spectrum and where at least a portion of such signals travel across at least a portion of the scene.

The term "3D point" or "3D coordinates" means a representation of the location of a point in the scene defined at least in part by at least three parameters that indicate distance in three dimensions from an origin reference to the point, for example, in three directions from the origin where the directions may be substantially perpendicular (at least not co-planar or co-linear), or as an alternative example using a spherical coordinate system consisting of a radial distance, a polar angle, and an azimuthal angle.

The term "3D neighbourhood" means a 3D volume in the scene whose maximum linear extent in one or more directions is limited to be less than a specified threshold. That threshold, which may be different for different directions, may be, for example, 0.1 mm, 1 mm, 5 mm, 1 cm, 5 cm, 10 cm, 50 cm, 1 m, 5 m, 10 m, 50 m, 100 m, or other value of appropriate scale when considering the overall size of the physical space represented by the scene. A 3D neighbourhood may be considered to contain one or more 3D points if the coordinates of those points lie within the 3D volume described by that 3D neighbourhood. Discussion and/or calculations that refer to 3D neighbourhoods in the present disclosure may apply to single 3D points.

The terms "3D scene information" or "3D information" or "scene information" mean information about a scene during a relatively static time period, where information about one or more 3D points and/or 3D neighbourhoods in the scene may optionally include none or one or more of: i) a characteristic location of the 3D neighbourhood (e.g., the arithmetic or geometric centroid of the 3D points contained in the neighbourhood); ii) the spectral information regarding the appearance of one or more points contained in the neighbourhood from the viewpoint of one or more cameras; and iii) a set of metadata that describe, at least in part, the points contained in the neighbourhood. The set of metadata may include one or more of the following properties: the texture of the points; spectral data from a region near the points; the instantaneous velocities of one or more points in one, two, or three dimensions (also allowing for one or more summarized velocity values such as the average velocity of the points in one, two, or three dimensions); the type or classification of object wholly or partially present in the 3D neighbourhood; and other data. As used herein, the term "relatively static time period" is defined elsewhere in this disclosure.

The term "3D velocity data" means the velocity components of the 3D scene information.

The term "sensor element" means a device that measures the intensity of the incoming electromagnetic spectrum arriving on its surface over a controllable period of time.

The term "image sensor" means a plurality of sensor elements arranged spatially. The plurality of sensor elements may be arranged in a planar, or substantially planar, relationship. The plurality of sensor elements may be arranged in a substantially regular pattern (for example, the sensor elements may be substantially equally spaced apart). The plurality of sensor elements may be arranged in an irregularly spaced pattern (for example, the sensor elements may be spaced apart at different distances). The plurality of sensor elements may be arranged regularly and irregularly spaced pattern (for example, at least two sensor elements may be substantially equally spaced apart and at least two sensor elements may be spaced apart at different distances substantially equally spaced apart). The sensor elements may be arranged in at least 1, 2, 3, or 4 planar, or substantially planar, relationships. Other spatial relationships of the sensor elements within an image sensor are contemplated.

The term "filter array" means a filter, or a set of filters, that are positioned in proximity to the sensor elements in an image sensor such that the filter, or the set of filters, limits the electromagnetic spectrum reaching sensor elements to a limited frequency range, so the sensor element responds to and measures the intensity of substantially that part of the spectrum. An example of a filter array is a Bayer filter which filters light in an RG-GB pattern across groups of 4 neighbouring sensor elements.

The term "camera" means a device that comprises an image sensor, an optional filter array and a lens (or a plurality of lenses) that focus potentially limited portions of incoming electromagnetic signals from the scene onto at least some of the sensor elements in the image sensor. The lens, for example, may be an optical lens, a diffraction grating or combinations thereof.

The term "camera centre" or "camera optical centre" is the abstract 3D point at which directed rays of the electromagnetic spectrum that enter the camera from sources in the scene would intersect if they could pass through filter arrays, lens(es) and/or sensor elements of the image sensor without impediment.

The term "each" as used herein means that at least 95%, 96%, 97%, 98%, 99% or 100% of the items or functions referred to perform as indicated. Exemplary items or functions include, but are not limited to, one or more of the following: location(s), image pair(s), cell(s), pixel(s), pixel location(s), layer(s), element(s), point(s), 3D neighbourhood(s), and 3D point(s).

The term "horizontal" in reference to image data may be used for convenience in referring to orientation. For example, in conventional terms image data may be considered to be arranged in horizontal scanlines. In practice the orientation of image data may be equally valid to be considered vertical, or be along rows of pixels, or be along columns of pixels, or be arranged along lines or curves (including discontinuous lines or curves) that have been chosen for computational, implementational or pedagogical convenience. In other cases the term "horizontal" may be understood to refer to a nominally horizontal orientation that may in fact be 5%, 10%, or 20%, or more off a strictly horizontal orientation.

The term "at least a substantial portion" as used herein means that at least 60%, 70%, 80%, 85%, 95%, 96%, 97%, 98%, 99%, or 100% of the items or functions referred to. Exemplary items or functions include, but are not limited to, one or more of the following: location(s), image pair(s), cell(s), pixel(s), pixel location(s), layer(s), element(s), point(s), 3D neighbourhood(s), and 3D point(s).

The term "spectral data" means the data representing electromagnetic signal's measured intensity produced from a selected plurality of sensor elements in an image sensor where the sensor elements, optionally assisted by a filter array, measure incoming intensity in a plurality of portions of the electromagnetic spectrum. One example of spectral data is a colour. Colour may be represented by the strength of electromagnetic signals in red, green and blue bands of visible light in the electromagnetic spectrum where filters are arranged in a Bayer pattern of RG-GB or similar. Alternative systems may also use non-visible bands in the electromagnetic spectrum or alternative bands in the visible spectrum. Further the spectral data may mean the collected output of a pre-determined number of sensor elements, at least a substantial portion configured to respond to at least one portion of the electromagnetic spectrum and may include those that sample multiple portions of the electromagnetic spectrum substantially simultaneously.

The term "optical flow data" means data describing the apparent local movement of the 2D image across the image plane at one or more locations in the image.

The term "pixel" means one of a plurality of data storage elements that have a two-dimensional neighbourhood relationship to each other that make them collectively topologically mappable onto a two dimensional grid. A pixel may contain electromagnetic spectral data sampled at a particular time from a sensor element that is part of an image sensor. A pixel may also contain the results of computational transformations of other data where there is an advantage to store the transformed data in a two dimensional grid (for example, filtered image data, rectified image data, optical flow data, uncertainty bounds, transparency data).

The term "pixel data" or "pixel-level data" means one or more of the spectral data and/or the optical flow data sensed or computed at a pixel location, and/or data derived from the spectral data and/or data derived from the optical flow data and/or data derived from other metadata associated with the pixel location.

The term "relatively static time period" means a period of time in which the substantial majority of the physical surfaces in a scene are at least substantially stationary relative to the camera. As used with respect to this term, the period of time may be about 0.0001 seconds, 0.01 seconds, 0.05 seconds, 0.1 seconds, 0.2 seconds, 1 second, or 10 seconds. As used with respect to this term, the period of time may be less than 0.0001 seconds, 0.01, 0.05, 0.1 seconds, 0.2 seconds, 1 second, 10 seconds or longer if appropriate to the situation. As used with respect to this term, the period of time may be between 0.0001 seconds and 10 seconds, 0.0001 seconds and 0.01 seconds, 0.01 seconds and 1 second, 0.05 seconds and 5 seconds, 0.1 seconds and 1 second, 0.2 seconds and 2 seconds, 1 second and 4 seconds, or 0.1 seconds and 10 seconds, or larger ranges as appropriate to the situation. As used with respect to this term, the period may be 1 minute, 10 minutes, 100 minutes or longer as appropriate when distances in the scene and/or speeds of objects or cameras are large enough (for example in satellite and/or space-based applications).

As used with respect to this term, the substantial majority may be at least 70%, 80%, 85%, 90%, 95%, or 100% of the physical surfaces in the scene. As used with respect to this term, the phrase "substantially stationary" means the physical surfaces' movements relative to the camera may be less than 0.1%, 0.2%, 0.5%, 1%, 2%, 5%, or 10% of their positions relative to the camera, or greater if appropriate to the situation.

The term "simultaneous frames" means the set of images (for example, 2, 3, 4, 6, 9, 16, 20, 32, 64 or other number) taken by one or more cameras of a plurality of cameras within a relatively static time period. The set of images taken by one or more cameras of a plurality of cameras within a relatively static time period may be at least 2, 3, 4, 6, 9, 16, 20, 32, 64, or more if appropriate to the situation and configuration of the camera array. In certain embodiments, at least 20%, 40%, 50%, 60%, 70%, 80%, 90% or 100% of the one or more cameras of a plurality of cameras may have simultaneous frame rate. In certain embodiments, at least 20%, 40%, 50%, 60%, 70%, 80%, 90% or 100% of the one or more cameras of a plurality of cameras may have substantially simultaneous frame rate. In certain embodiments, one or more cameras of a plurality of cameras may have different simultaneous frame rates. In certain embodiments, less than 20%, 40%, or 50% of the one or more cameras of a plurality of cameras may have different simultaneous frame rates.

The term "geometric median" means a point constructed to be in a position within a multi-dimensional space amongst a set of data points in that space in such a way that the sum of Euclidean distances to a portion data points from the geometric median point thus constructed is mathematically minimised. In certain embodiments, the portion of data points may be a substantial portion. In certain embodiments, the portion of data points may be at least 60%, 70%, 80%, 90%, 95%, 98%, 99% or 100% of the data points.

The term "baseline" means the non-zero distance between the optical centre of a camera used to capture at least one first image and the optical centre of a camera used to capture at least one second image. The camera used to capture the at least one first image may be the same, or substantially the same, as the camera used to capture the at least one second image, where the camera has moved some distance between capture of the at least one first image and capture of the at least one second image.

The term "disparity" means the mathematical difference between the pixel location on one image (relative to a fixed origin pixel location in that image) of a feature in a scene, and the pixel location on a second image (relative to a fixed origin pixel location in the second image) of the same feature.

The term "binocular" means forming or using a pair of images captured from two cameras (i.e., camera pair) separated by a baseline.

The term "camera array" means a plurality of cameras; wherein one or more of the cameras have overlapping fields of view and the number of cameras is 4 or more. The term "camera array" may also mean one or more cameras where the one or more cameras move within the relatively static time-period such that the cameras' substantially overlapping fields of view are maintained during the relatively static time-period. As used in this term, overlapping fields of view means that at least 5%, 10%, 20%, 30%, 40%, 50%, or 60% of the fields of view overlap. In certain embodiments, at least 25%, 50%, 75%, or 100% of the one or more cameras have overlapping fields of view. In certain embodiments, the camera array may have at least 4, 5, 6, 7, 8, 9, 10, 20, 50, 100 or more cameras. In certain embodiments, the camera array may have between 4 to 8, 4 to 16, 8 to 32, or 32 to 128 cameras.

The term "real-time" means processing may be sufficiently fast that resulting information may be used for making decisions substantially at the time of operation. Non-limiting examples may be for applications on one or more of the following: a car, a truck, a train, an airplane, a helicopter, a drone, a satellite, a tractor, a ship, mobile farm or mining equipment, a fixed crane or observation point (e.g., security viewpoint) or a boat where real-time processing may be processing that is performed within 100 minutes, 10 minutes, 1 minute, 1 second, 100 ms, 10 ms, 1 ms or other value appropriate to the situation.

The term "real-time frame rates" means the capacity of a processing system to process image data at real-time speeds. For example, in processing image data the real-time frame rate may be at least 0.1, 1, 10, 30, 60 100, or higher frames per second. For example, in processing image data the real-time frame rate may be between 0.1 to 1, 0.1 to 10, 0.1 to 100, 1 to 100, 1 to 60, 1 to 30, 1 to 10, 10 to 100, 10 to 60, 30 to 100, 30 to 60, 60 to 100, or higher frames per second.

The term "camera pair" means a pair of cameras selected from the camera array.

The term "image pair" means a pair of images such as captured from the cameras in a camera pair.

The term "reference surface" means a conceptual surface, typically not a physical surface, with a known geometric position relative to the camera array that may be used as a common reference for determining depths in a scene from multiple cameras. The reference surface may be curved or may be planar.

The term "small irrelevant particle occlusions" means one or more transient objects that may be ignored, or substantially ignored, for the purposes of a particular application of the system. For example, in the case of driving a standard car along a road, raindrops may not need to be avoided and may not represent a safety threat. In this application therefore raindrops may be deemed small irrelevant particle occlusions. Further similar examples include one or more of the following: snow, hail, dust, individual leaves floating in the air, and insects.

The term "extrinsic camera parameters" mean parameters describing the cameras location and orientation in space with respect to a designated frame of reference and/or origin point. The extrinsic camera parameters may be represented as a 3D translation vector [x, y, z] and a 3×3 rotation matrix.

The term "intrinsic camera parameters" mean parameters that describe a how a camera maps points observed in the real world into the camera image plane or image sensor, thus characterizing the optical and geometric properties of the camera. For example, intrinsic camera parameters may include one or more of the following: the field of view, focal length, the image center, descriptors of radial lens distortion, and descriptors of other distortions.

Certain Exemplary Advantages

In addition to other advantages disclosed herein, one or more of the following advantages may be present in certain exemplary embodiments:

One advantage may be that an accurate 3D scene information stream may be calculated at real-time frame rates, or substantially real-time frame rates, to enable navigation decisions by higher level systems. Examples of such navigation decisions include, but are not limited to, trajectory selection, collision avoidance, road following, driving risk assessment, safe speed determination, driver assistance, driver alerts, safe distance following, personal space navigation, or combinations thereof.

Another advantage may be there is no need, or lesser need, for other sensors (for example, radar and/or LiDAR). This reduction in the need for other sensors substantially reduces the cost and/or complexity of implementing autonomous navigation in vehicles, robots and/or planes as well as may also improving accuracy. In certain embodiments, however, other sensors (for example ultrasonics, radar and/or LiDAR) may be added to supplement the system.

Another advantage of certain embodiments may be there is not a need, or less of a need, for integration between disparate sensor systems. This substantially reduces the cost and/or complexity of implementing autonomous navigation in vehicles, robots and/or planes whilst also improving accuracy. The present disclosure contemplates integration between disparate sensor systems, which may nevertheless be included in certain embodiments.

Another advantage of certain embodiments is that it may reduce the impact of particle occlusions (for example, one or more of the following: rain, snow, dust, and insects) on the system, as the visible impact of such occlusions in 2D images made using sensor elements sensitive to many of the spectral ranges in and near the conventional visual spectrum is not as severe as in LiDAR or other alternative sensing modalities.

In addition, the fact there are multiple cameras in the array means obscuring, or partially obscuring the view from limited fraction of cameras in the array may not substantially impact the overall performance of the system.

Another advantage of certain embodiments may be that an accurate 3D scene information stream may be calculated at real-time frame rates, or substantially real-time frame rates, facilitating tracking objects in a scene to enable one or more of the following: security and surveillance of streets, parks, private or public spaces or buildings where real-time, 3D information may allow tracking people, identifying actions and activities, assist with detection of unusual behaviours, determine information about the flow of people or vehicles in a space, determine alerts such as collisions or slip-and-fall, monitoring the size of crowds, and monitoring the flow and/or behaviour of crowds.

Certain embodiments are directed to using passive optical systems to produce 3D scene information of scenes in real-time, or substantially real-time.

Certain embodiments provide a camera solution that may be built using cameras in a fixed array that view a scene from different positions. The resultant differences between multiple views of the scene may be compared to compute 3D scene information. This may be accomplished by comparing pixels of one image to those in another image taken from a camera located at an offset from the first. The degree of offset necessary (disparity) depends at least in part on the distance from the cameras to the physical surface being viewed at the respective pixel locations in question, and also depends at least in part on the distance between the two camera centres (i.e., the baseline of the camera pair). For example, a wider baseline may result in improved long-range accuracy but may have problems with increased minimum distance, as the views may not overlap close to the cameras.

Certain embodiments allow cameras in a camera array to be placed in irregular arrangements and orientations, and yet allow for efficient computation of a large number of disparity estimates so that angular and/or depth resolution and/or accuracy are high.

System Diagram

FIG. 1 shows a system diagram 100 of certain exemplary embodiments. The system includes a camera array 110 and a processing engine 115. In certain embodiments, one or more computer systems perform one or more steps of one or more methods described or disclosed herein. In certain embodiments, one or more computer systems provide functionality described or shown in this disclosure. In certain embodiments, software configured to be executable running on one or more computer systems performs one or more steps of one or more methods disclosed herein and/or provides functionality disclosed herein. Reference to a computer system may encompass a computing device, and vice versa, where appropriate.

This disclosure contemplates a suitable number of computer systems. As example and not by way of limitation, computer system (115) may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a personal digital assistant (PDA), a server, a tablet computer system, an augmented/virtual reality device, or a combination of thereof. Where appropriate, computer system (115) may include one or more computer systems; be unitary or distributed; span multiple locations; span multiple machines; span multiple data centres; or reside in a cloud, which may include one or more cloud components in one or more networks. Where appropriate, one or more computer systems (115) may perform without substantial spatial or temporal limitation one or more steps of one or more methods described or illustrated herein. As an example, and not by way of limitation, one or more computer systems (115) may perform in real time or in batch mode one or more steps of one or more methods disclosed herein.

The computer system (115) may include a processor unit (160), memory unit (170), data storage (190), a receiving unit (150), and an external communication unit (180).

The processor unit (160) may include hardware for executing instructions, such as those making up a computer program. As an example, and not by way of limitation, to execute instructions, processor unit (160) may retrieve the instructions from an internal register, an internal cache, memory unit (170), or data storage (190); decode and execute them; and then write one or more results to an internal register, an internal cache (not shown), memory unit (170), or data storage (190). The processor unit (160) may include one or more internal caches for data, instructions, or addresses. This disclosure contemplates processor units (160) including a suitable number of suitable internal caches, where appropriate. The processor unit (160) may include one or more instruction caches, one or more data caches, and one or more translation lookaside buffers (TLBs). Instructions in the instruction caches may be copies of instructions in memory unit (170) or data storage (190), and the instruction caches may speed up retrieval of those instructions by processor unit (160).

The memory (170) may include main memory for storing instructions for processor to execute or data for processor to operate on. The computer system (115) may load instructions from data storage (190) or another source (such as, for example, another computer system) to memory unit (170). The processor unit (160) may then load the instructions from memory unit (170) to an internal register or internal cache. To execute the instructions, the processor unit (160) may retrieve the instructions from the internal register or internal cache and decode them. During or after execution of the instructions, the processor unit (160) may write one or more results (which may be intermediate or final results) to the internal register or internal cache. The processor unit (160) may then write one or more of those results to the memory unit (170). The processor unit (160) may execute only instructions in one or more internal registers or internal caches or in the memory unit (170) (as opposed to data storage (190) or elsewhere) and operates only on data in one or more internal registers or internal caches or in memory unit (170) (as opposed to data storage (190) or elsewhere). One or more memory buses may couple processor unit (160) to memory unit (170). The bus (not shown) may include one or more memory buses. The memory unit (170) may include random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. Memory unit (170) may include one or more memories, where appropriate.

The data storage (190) may include mass storage for data or instructions. The data storage (190) may include a hard disk drive (HDD), flash memory, an optical disc, a magneto-optical disc, magnetic tape, or a Universal Serial Bus (USB) drive or a combination therein. Data storage (190) may include removable or non-removable (or fixed) media, where appropriate. Data storage (190) may be internal or external to computer system, where appropriate. Data storage may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination thereof.

In certain embodiments, I/O interface (not shown) may include hardware, software, or both, providing one or more interfaces for communication between computer system and one or more I/O devices. Computer system may include one or more of these I/O devices, where appropriate. One or more of these I/O devices may enable communication between a person and computer system. An I/O device may include a keyboard, keypad, microphone, monitor, mouse, printer, scanner, speaker, still camera, stylus, tablet, touch screen, trackball, video camera, another suitable I/O device or a combination thereof. An I/O device may include one or more sensors. This disclosure contemplates any suitable I/O devices and any suitable I/O interfaces for them. Where appropriate, I/O interface may include one or more device or software drivers enabling the processor unit (160) to drive one or more of these I/O devices. I/O interface may include one or more I/O interfaces, where appropriate.

The computer system is configured to execute certain exemplary embodiments. In certain embodiments, the relative position and/or orientation of cameras on the camera platform 110 may be known. In certain embodiments, the cameras on the camera platform may have a trigger (not shown) that enables image frames to be captured at specific times, or at least have the time of the image capture be recorded at a precision at least as fine as the interval chosen for the application as fulfilling the definition of a relatively static time period. In certain embodiments, the camera platform may include related circuitry (not shown) to ensure capture of images from cameras on the camera platform at times controlled by external systems 110.

Figure 10:
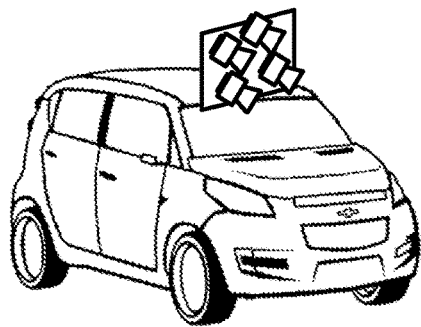
FIG. 10 is an illustration of exemplary uses and possible camera array configurations, according to certain embodiments.
Figure 10:
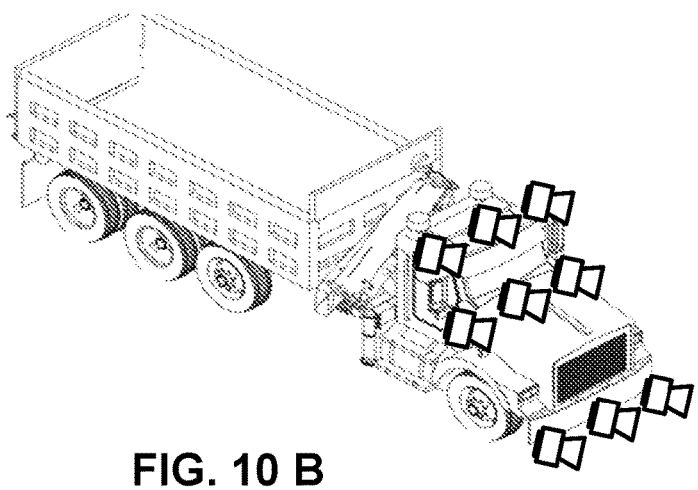
Figure 10:
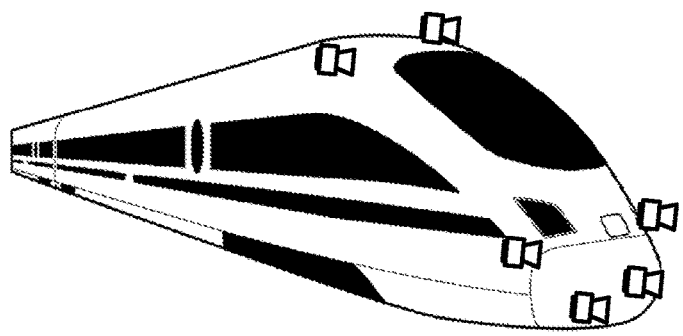
Figure 10:
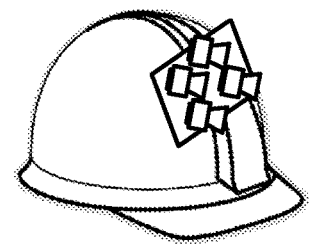
Figure 10:
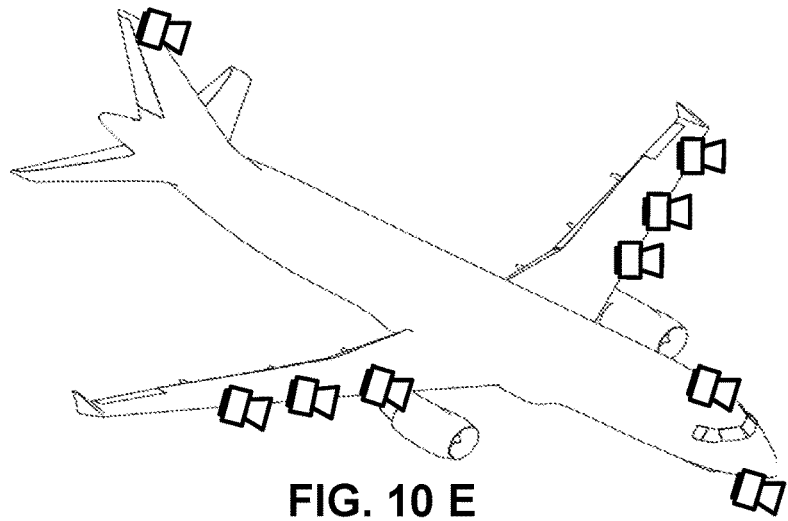

The camera array 110 includes a set of cameras laid out in an array of M wide and N high. Horizontal rows of the array are indicated with the dotted lines 125, 135, 145. Exemplary cameras, such as 120, 130, 140 are described in detail herein. Although FIG. 1 shows a regular array, embodiments exist where one or more of the following may be present: the array is not regular, the rows may not contain the same number of cameras, the cameras differ according to their spectrum sensitivities, and the array is not in a single vertical plane. For example, the cameras may be arranged in a circular pattern, a zigzagged pattern, a scattered pattern and some of the cameras may be offset (but still fixed) in one or more of the three dimensions. FIGS. 12A-J. illustrates a variety of examples of camera array configurations including A) a rectangular array of 2×2 cameras, B) a rectangular array of 3×2 cameras, C) a rectangular array of 3×3 cameras, D) a rectangular array of 4×4 cameras, E) a configuration of 12 set about the perimeter of a rectangle, F) a configuration of 12 set about the perimeter of a rectangle with a further 6 camera set about the perimeter of a smaller concentric rectangle, G) a rectangular array of 2×5 cameras in vertical orientation, H) a rectangular array of 6×2 cameras in a horizontal orientation, I) a configuration of 8 cameras set about the perimeter of a circle, and J) a configurations of 13 cameras set about the perimeter of a circle with a further 8 cameras set about the perimeter of a smaller concentric circle. Further configurations designed based on the use-case or vehicle are given as examples in FIG. 10. and FIG. 11. and are described in detail elsewhere in this disclosure.

In certain embodiments, the relative position and/or orientation of cameras in the camera array may be known. In certain embodiments, the cameras in the camera array may have a synchronised trigger (not shown) that enables substantially simultaneous image frames to be captured across the array, a substantial portion of the array, or a portion of the array. In certain embodiments, the camera array may include related circuitry (not shown) to ensure synchronised capture of images from cameras in the camera array 110.

The processing engine 115 includes a receiving unit 150 for communication with the cameras in the camera array 110. The receiving unit is connected via a communication bus 151 with the processor unit 160, and a memory unit 170. The processor unit 160 may be a general-purpose CPU or GPU or may be customised hardware such as an FPGA or ASIC designed to perform the required processing. The memory unit 170 may include volatile and/or non-volatile memory. It may store instructions for the processing unit 160 as well as image data received from the receiving unit 160 via the communications bus 152. The processing unit 160 may also be connected to a data store 190 via a communications bus 162. The processing unit 160 may be also connected to an external communications unit 180 via 163. The communications unit 180 may be used to output a stream of 3D information for the use of external systems (not shown). The communications unit 180 may also receive data from external sources including one or more of the following: position data, map data, and previously recorded data regarding the scene, and previously recorded 3D information and/or other data regarding the scene.

Cameras in the camera array 110 may be connected to the processing unit 115. Cameras may have a communication channel indicated by 121, 131, 141 to accept control and/or synchronisation signals and to output image data. Synchronous capture of images from one or more cameras in the camera array 110 may be operated by signals sent over the communication channel 121, 131, 141.

Exemplary Camera System

Figure 2:
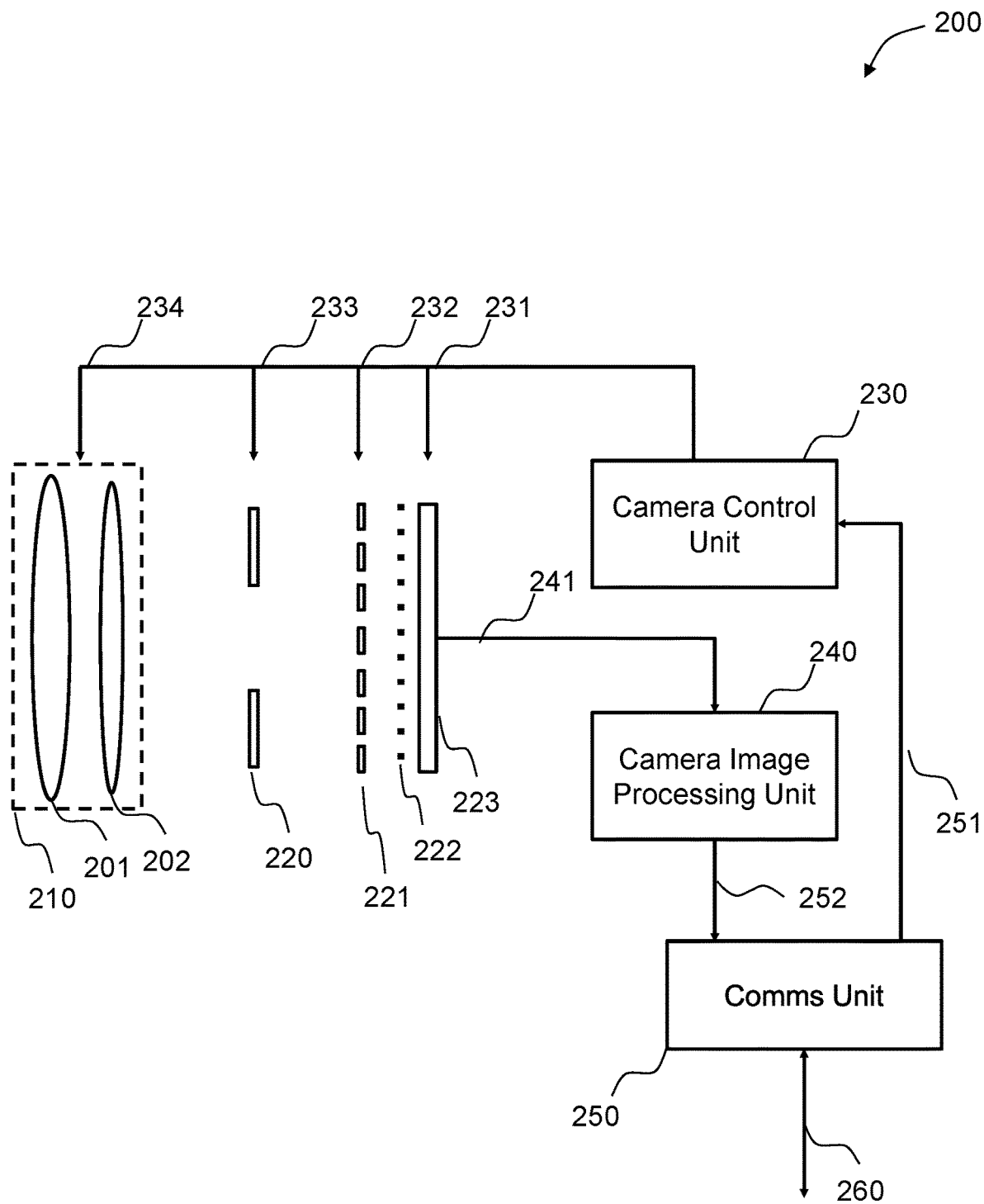
FIG. 2 is a schematic component diagram for a camera used in a camera array, according to certain embodiments.

FIG. 2 describes the details of an exemplary camera system 200 which may be used for cameras in the camera array 110. The camera system includes a lens module 210 consisting of optical elements 201, 202. There is also an aperture 220, a shutter 221 and a sensor 223. In certain embodiments, the sensor 223 may be overlaid with a filter array, for example a Bayer filter 222, which enables the capture of colour and/or multi-spectral images. The sensor 223 may be sensitive to a portion of the electromagnetic spectrum, including, but not limited to, one or more of the following: the visual, the infra-red and the ultraviolet spectrum.

The sensor 223 is connected to a camera image processing unit 240 which may perform image processing of raw image data captured by the sensor 223. In certain embodiments, the image processing steps may include one or more of the following: de-Bayering, compensating for lens distortion, or colour corrections. In certain embodiments, processing images to compensate for lens distortion unwarps the images so that they conform, or substantially conform, to the output of a pin-hole camera. Many camera lens systems generate images with certain warping, for example a fish-eye lens warps a scene into a wide panoramic representation of the world but one where lines of perspective are warped. By compensating for lens distortion, straight lines in the scene may appear straight in the processed images.

Processed images may be passed via a communication bus 252 to the communications unit 250. Processed image data may be sent via 260 to the processing engine 115. The communications unit 250 may also receive control and/or synchronisation signals from the processing engine 115. Control and/or synchronisation signals may be passed onto camera control unit 230. The camera control unit 230 actions camera control signals via control lines 234, 233, 232, 231 enabling adjustment of one or more of the following components of the lens system 210: the aperture 220, the shutter 221 and the sensor 223. Such controls may be used to adjust one or more of the following: imaging parameters (such as gain), exposure times, white and/or black level offsets and filter settings. The camera control unit 230 may also coordinate the activation of one or more of the following: the aperture 220, the shutter 221 and the sensor 223 to capture images. The camera control unit 230 may receive a synchronization signal via the Comms Unit 250 which ensures that cameras in the camera array 110 are synchronized to capture images simultaneously.

Exemplary Illustrative Scene

Figure 3:
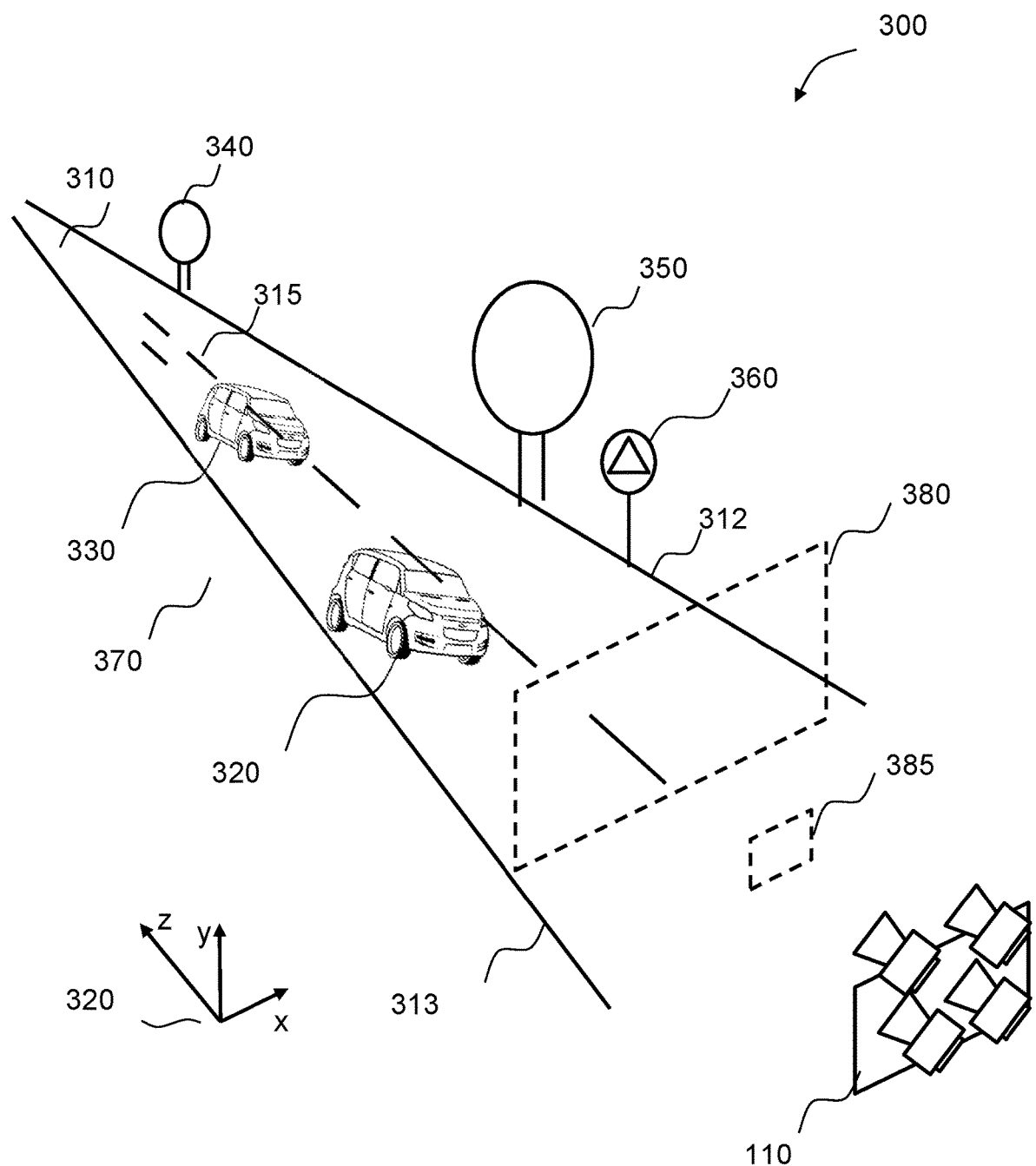
FIG. 3 is an illustration of an exemplary real-world scene observed by a camera array and showing a Reference Surface which is in this case a fronto-parallel plane.

FIG. 3 shows a figurative scene 300. The road 310 is illustrated with lines 312, 313 marking the edge of the road marking 315 for the centre line of the road 310. In this scene there are two cars 320, 330 on the road. Also shown are trees 340, 350 and a sign 360, positioned to the side of the road. A camera array 110 is shown oriented to observe the scene. The camera array 110 may be located on a vehicle (not shown) and may itself be travelling along the road. A dashed rectangle marks the location and orientation of a Reference Plane 380, positioned in the view of the camera array 110. The Reference Surface 380 (shown here as a plane) forms a common reference for generation of 3D information using images from the cameras of the camera array 110.

Figure 4:
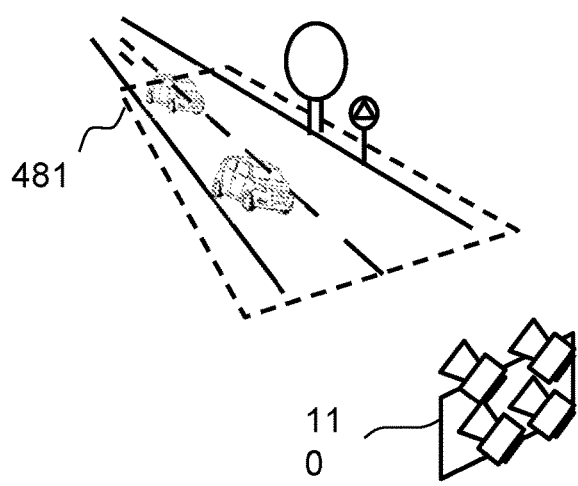
FIG. 4 is an illustration of alternative placements of a Reference Surface.
Figure 4:
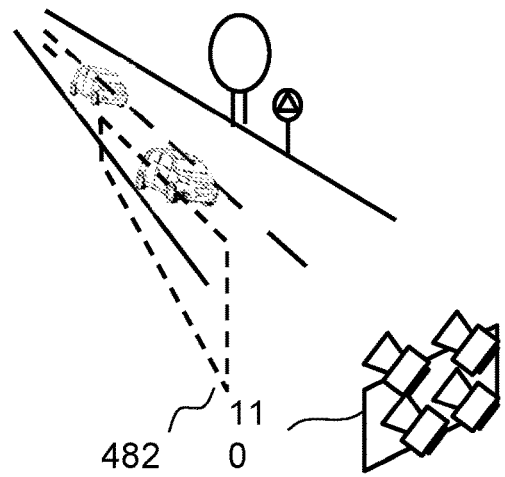
Figure 4:
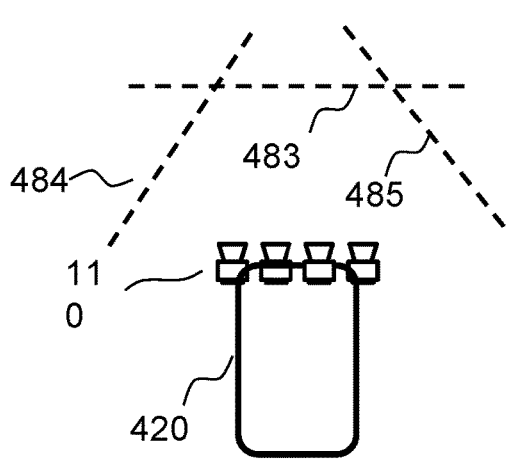
Figure 4:
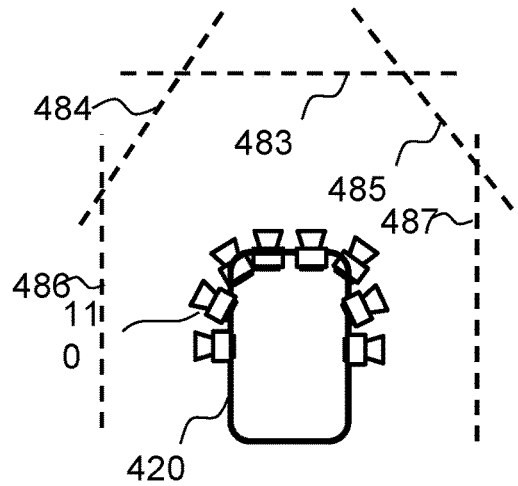
Figure 4:
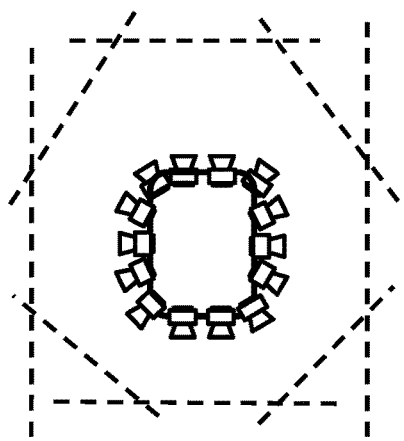
Figure 4:
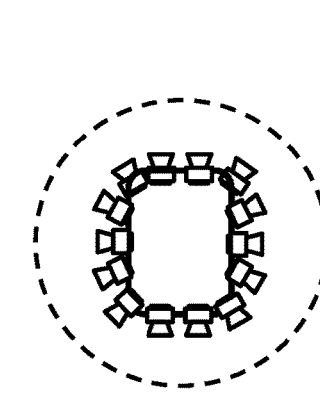
Figure 4:
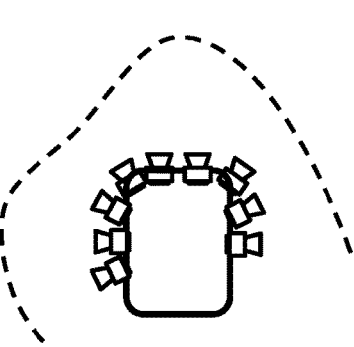

FIG. 4 A shows an alternative arrangement where the Reference Surface 481 lies in a horizontal orientation, approximately parallel to the ground and approximately on the same level as the ground. FIG. 4 B shows an alternative arrangement where the Reference Surface 482 lies in a vertical orientation but to the side. Other orientations of the Reference Surface are also possible, for example parallel to the ground and above the road surface or perpendicular to the ground and posed diagonally to one forward quarter of the vehicle. Depending on the application of a particular embodiment, the orientation of the reference surface may affect the computational costs and/or accuracy of the depth estimation process.

There may also be advantages, even with a single camera array, to construct several reference surfaces (or sets of reference surfaces). Reference surfaces may be selected that reflect the a-priori known likelihood of where Physical Surfaces may appear during operation of the camera array. For example, in the case of an autonomous car, the ground is typically horizontal and buildings (in built up areas)

typically align to vertical planes on the sides of the road. In certain embodiments, multiple reference surfaces may be used with a camera array. FIG. 4 C shows a camera array 110 set in a forward position on a vehicle 420 has set about it reference surface 483, 484 and 485, one or more of which may be used as a basis for determining depths according to this disclosure. FIG. 4 D shows a camera array 110 configured in an arch and multiple reference surface 483, 484, 485, 486 and 487 set about the vehicle 420 to the front and sides and on the left and right forward quarters. FIG. 4 E shows a further possible arrangement with a camera array providing a 360 degree orientation and, in this example eight reference surfaces also set about the vehicle giving a 360 degree coverage. FIG. 4 F and FIG. 4 G shows further possible arrangements with a camera array providing a 360-degree orientation and an irregular curved Reference Surface having a limited coverage about the vehicle.

Epipolar Planes and Lines

Figure 5:
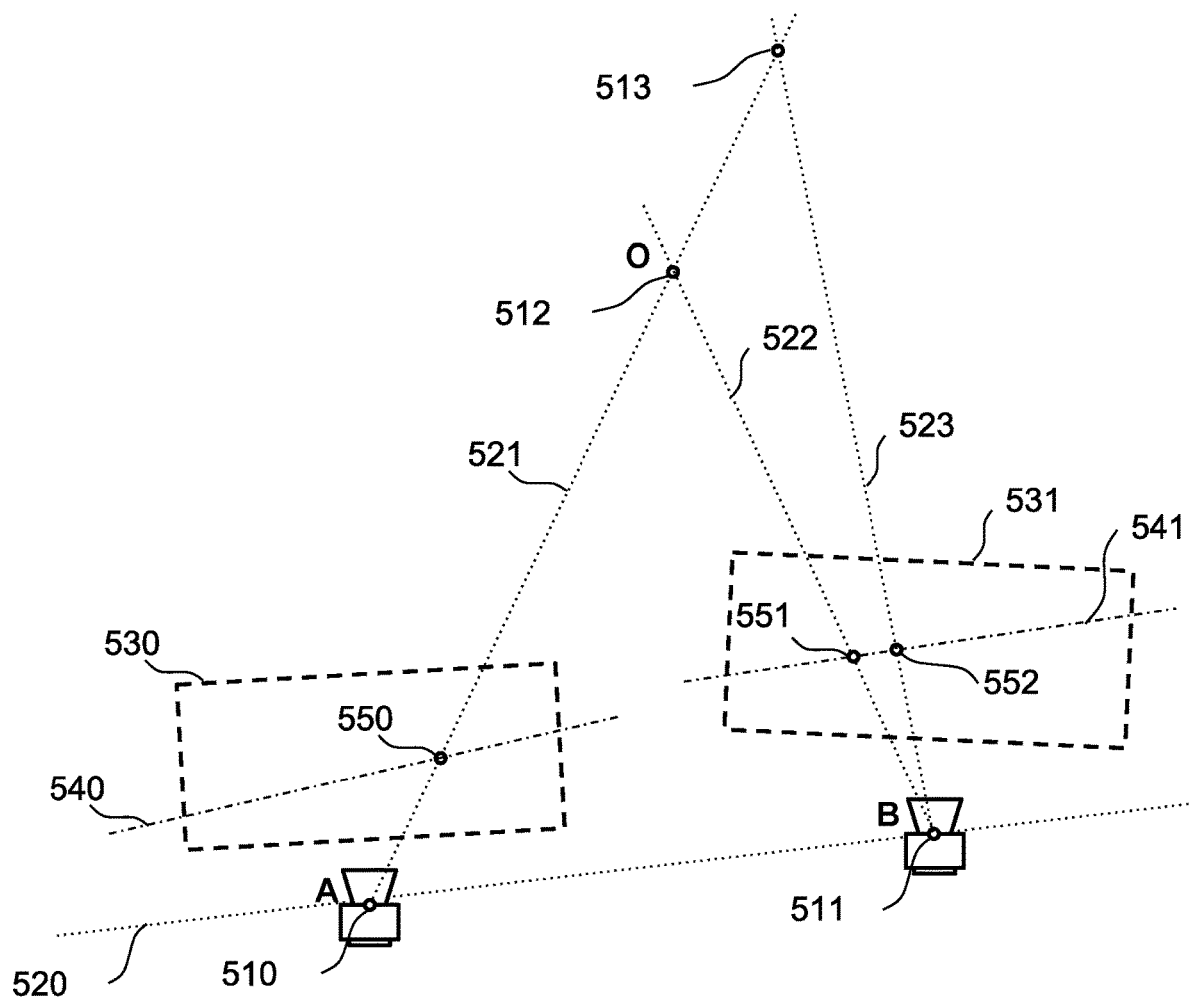
FIG. 5 is an illustration of an epipolar plane and epipolar lines for a camera pair.

FIG. 5 may be used to describe an exemplary relationship between a Scene, a pair of cameras, epipolar planes and associated epipolar lines. In this exemplary, an epipolar plane is the plane defined by three points: camera centre (or camera optical centre) A 510, camera centre (or camera optical centre) B 511, and a point of interest in the scene O 512. The epipolar lines are the pair of lines defined by the intersections of the respective image planes of each camera in the pair with the epipolar plane associated with a point of interest in the scene (in this case O 512). Referring to FIG. 5, an arrangement of camera A 510 and camera B 511 are shown observing a Scene with a point of interest O 512. Also shown is a representation of the image data 530 showing the view of camera A 510, and representation of the image data 531 showing the view of camera B 511. As illustrated, camera A 510 and camera B 511 may be posed with different orientations (e.g., pan, tilt and/or rotation) and/or different intrinsic parameters (e.g., focus, zoom) so consequently their image data 530, 531 may appear rotated and/or stretched with respect to one another other and with respect to the epipolar plane. As shown by dashed line 540 the epipolar plane intersects the image plane 530 of camera A 510 and similarly 541 marks where the epipolar plane intersects the image plane 540 of camera B 511. Considering the appearance in the Scene of a Physical Surface located at point O 512, the Physical Surface may be observed in image 530 at 550 on the epipolar line 540 and similarly may be observed in image 531 at 551 on the epipolar line 541. However, an observation in image 531 at 552 (instead of 551), also on the epipolar line 541 would indicate the location of the Physical Surface at 513 (instead of 512).

Epipolar Rectification

Referring to FIG. 6 A an image 610 on the left is the image data captured by camera A 510 in a Camera Pair and the image 611 (in FIG. 6 B) on the right is the image data captured by a camera B 511 in the Camera Pair. Epipolar lines for the left image, for example, 612 and for the right image, for example, 613 depend on the relative positions of the two cameras. The epipolar lines for images 610 and 611 may be determined from the Intrinsic Camera Parameters and Extrinsic Camera Parameters determined during a process of Camera Calibration. Camera Calibration techniques are known in the art. Image warping may then be defined so that epipolar lines become horizontal, and the image data along horizontal scanlines is therefore in a more convenient position for subsequent processing (i.e., computations based on horizontal shifts and offsets of the image data may be what is required to pass data to subsequent processing stages). FIG. 6 C shows the result of epipolar warping on the image of FIG. 6 A. And, FIG. 6 D shows the result of epipolar warping on the image of FIG. 6 B. For example, in FIG. 6 C image 620 shown, with epipolar lines including 622 now horizontal and image 621 (FIG. 6 D) also with epipolar lines such as 623. Further, warped images 620 and 621 may be generated so that epipolar lines 622 and 623, where from the same, or substantially the same, epipolar plane, may be stored in same, or substantially same, row position in their respective images.

Construction for Consistent Depth Shift Images

Figure 7:
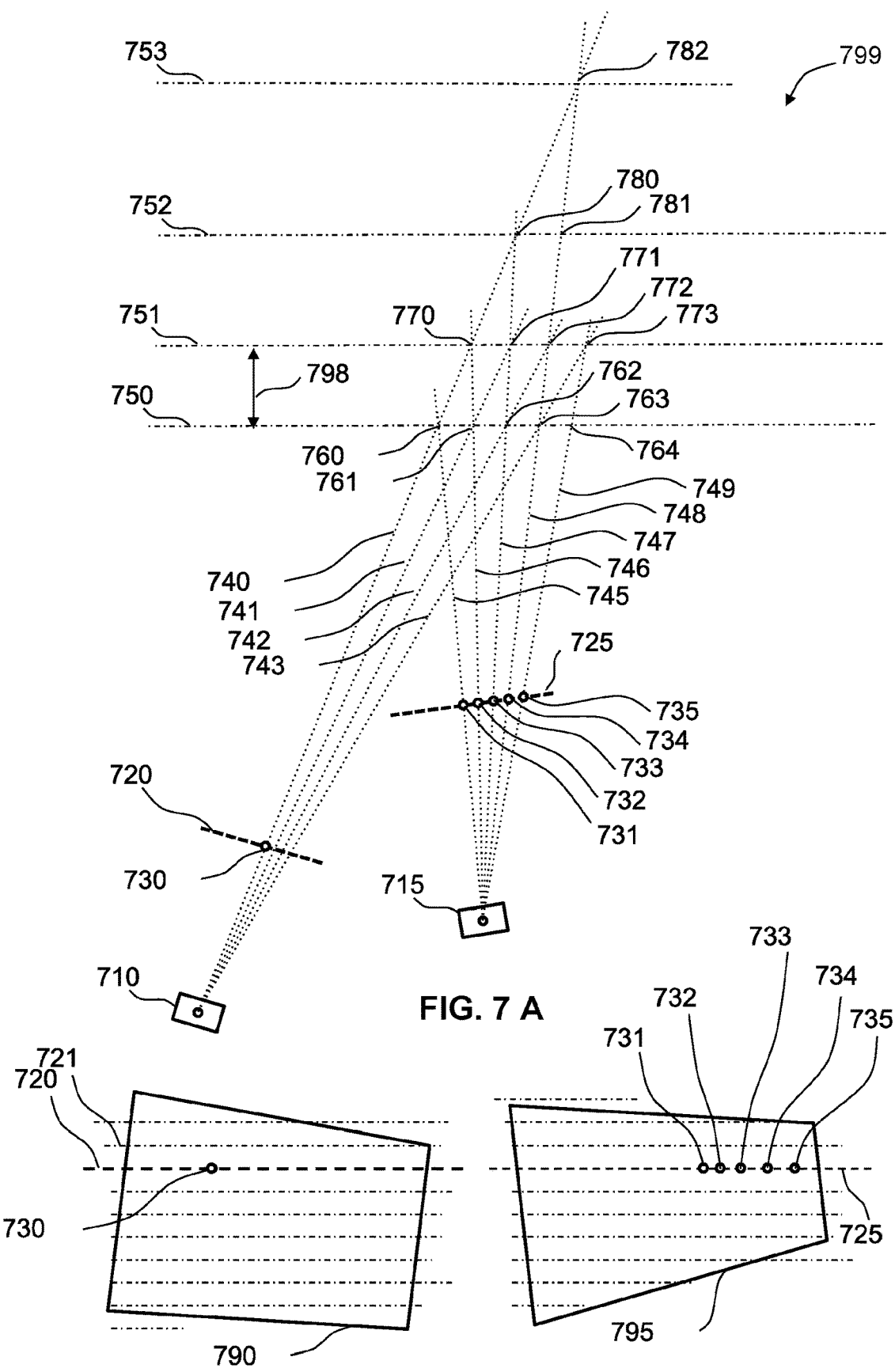
FIG. 7 is an illustration of a geometric construction for creating Consistent Depth Shift Warps for a camera pair.

Next is discussed an exemplary geometric construction for generation of pairs of Consistent Depth Shift Images. The construction within a single epipolar plane is shown at an exemplary position in FIG. 7 A (the epipolar plane is the plane of the diagram itself 799) and projected onto a single scanline 720 in the rectified image 790 (as shown in FIG. 7 B). The single scanline 720 appears also in FIG. 7 A as the dotted intersection between the image plane of the camera and the epipolar plane 799. This construction process may be repeated on other epipolar planes oriented at other angles about the line between the camera centres 710, 715 (in this way the line joining 710 and 715 is the only line contained in the epipolar planes). Repeating the process for these other epipolar planes which consequently intersect the image plane 790 at different heights and thus define different horizontal scanlines, creates a 2-dimensional image where horizontal scanlines represent the image data extracted along each epipolar line (shown in FIG. 7 B at for example 720, 721 and by extension the other dotted horizontal lines shown).

FIG. 7A is an arrangement of camera A 710 and camera B 715 that are shown observing a Scene. A thick dashed line 720 (FIG. 7 A left side) represents an epipolar line in the image of camera 710 and another thick dashed line 725 (FIG. 7 A right side) represents an epipolar line in the image of camera 715. A dot-dash line represents the reference surface 750 (FIG. 7A), being the intersection of the reference surface and an epipolar plane (799); further surfaces at constructed offsets 751, 752 and 753 are also shown and referred to as derived reference surfaces. On the epipolar line 720 of camera 710 a physical surface may be observed at 730. The physical surface may be deduced to lie on the line 740 projecting from camera 710 through 730 and into the scene. The physical surface may, for example, be observed by camera 715 on epipolar line 725 at 3D point 731. Then by projecting line 745 and using triangulation the physical surface may be deduced to be at point 760 where lines 740 and 745 intersect and sufficient agreement is found between the pixel 730 (captured by camera 710) and pixel 731 (captured by camera 715). Derived reference surface 751 is positioned with a known offset to the Reference Surface 750. The line 740 intersects with derived reference surface 751 at point 770, and a line 746 drawn through 770 and camera 715 intersects the epipolar line 725 of camera 715 at point 732. If, as an alternative example, close pixel agreement with 730 was observed in camera 715 not at pixel 731 but instead at pixel 732 this would indicate that the Physical Surface was at the point 770 on the derived reference surface 751. Continuing with the construction, line 746 intersects the Reference Plane 750 at 761 and this point is used as the basis for a new line 741 produced from camera 710, through 761. Repeating the process, line 741 intersects derived reference surface 751 at point 771 and new line 747 and point on the epipolar line 725 of camera 715 are found. Noting that line 740 and 747 intersect on a surface 752 a Physical Surface in the scene observed in camera 710 at 730 and in camera 715 at 733 may be deduced to lie at point 780 on surface 752 by checking for sufficient agreement between the pixel data captured by camera 710 at location 730 and by camera 715 at location 733. The construction may be continued further generating points on the epipolar line 725 for camera 715 that correspond to suppositions of Physical Surfaces potentially in the scene on surface 753 and beyond. The pixels at points 731, 732, 733, 734, 735 and beyond may be envisaged on the epipolar line 725. A change of close pixel data agreement in camera 715 to the right, say for example from 734 to 735 may indicate an increase in the deduced Physical Surface's depth to be aligned on a derived surface further away from the cameras (up the page); and to the left, say from 734 to 733 may indicate a decrease in the deduced Physical Surface's depth to a derived surface nearer to the cameras (down the page).

Referring to FIG. 7B image 790 represents an image from camera 710 warped by epipolar rectification as viewed along the horizontal epipolar lines (e.g., 720, 721) indicated with dot-dash lines in the illustration. Similarly, image 795 represents an image from camera 715, also after epipolar rectification and with epipolar line 725 shown with a dashed line. The observed point 730 is again shown in the image 790 lying on the epipolar line 720. And similarly observed points 731, 732, 733, 734, 735 are again shown in the image 795 lying on the epipolar line 725.

In general, the spacing of points 731, 732, 733, 734, 735, and so forth on the epipolar line 725 may not be uniform and may be determined by the relative 3D positions of the camera 710 and 715, the Reference Surface 750 and a single depth offset to one of the derived reference surfaces (shown in this example as the gap between 750 and 751 indicated by 798). There may be significant computational efficiency to be gained by arranging pixel locations along one or more digitised/quantised (and rectified) epipolar lines to be spaced so as to represent confluences of depths on the spaced out reference surface and set of derived reference surfaces (750, 751, 752, 753, and beyond). In the case where the reference surface is planar, the spacing that achieves this may be shown to follow a geometric progression along the epipolar line 725 (FIG. 7 B) and may be calculated in detail by the geometric construction just described or by other methods based on suitable mathematical or geometric principles (e.g., analytic geometry).

As is shown and described in the construction, the chosen shape of a Reference Surface (e.g., 750) and a separation distance to a first derived reference surface of a chosen shape (e.g., 751 and 750 are simple planes and 751 is separated from 750 by the chosen spacing 798) precisely defines the locations of the intersection points such as 760, 770, 780, 782 and 761, 771, 781, etc, as well as the locations and shapes of other derived reference surfaces 751, 752, 753 etc. These intersection points may be considered members of 3D neighbourhoods. In the Camera Array 110, other images taken by other cameras (not shown in FIG. 7 A) may be taken from positions above, below in front or behind the illustrated plane (i.e., not on the illustrated epipolar plane 799) and other image pairs may be defined by selecting images from them. These other image pairs may have their own epipolar planes, epipolar lines and intersection points as constructed similarly as described using the same, or substantially the same, reference surface and derived reference surfaces. The intersection points for the other image pairs may not coincide exactly with the intersection points for the camera pair 710, 715 (e.g., intersection points 760, 770, 780, 782 and 761, 771, 781, etc.). Nevertheless, intersection points generated on other epipolar planes with other image pairs may be found that are near to the intersection points 760, 770, 780, 782 and 761, 771, 781, etc such that 3D neighbourhoods of suitably limited 3D extents may be formed around a substantial number of the intersection points.

Information sampled from the points in these 3D neighbourhoods, from the point of view of various cameras in the camera array, form the basis of assessing the likelihood of there being a physical surface present in the 3D neighbourhoods thus formed.

Construction for Consistent Depth Shift with Curved Reference Surface

Figure 9:
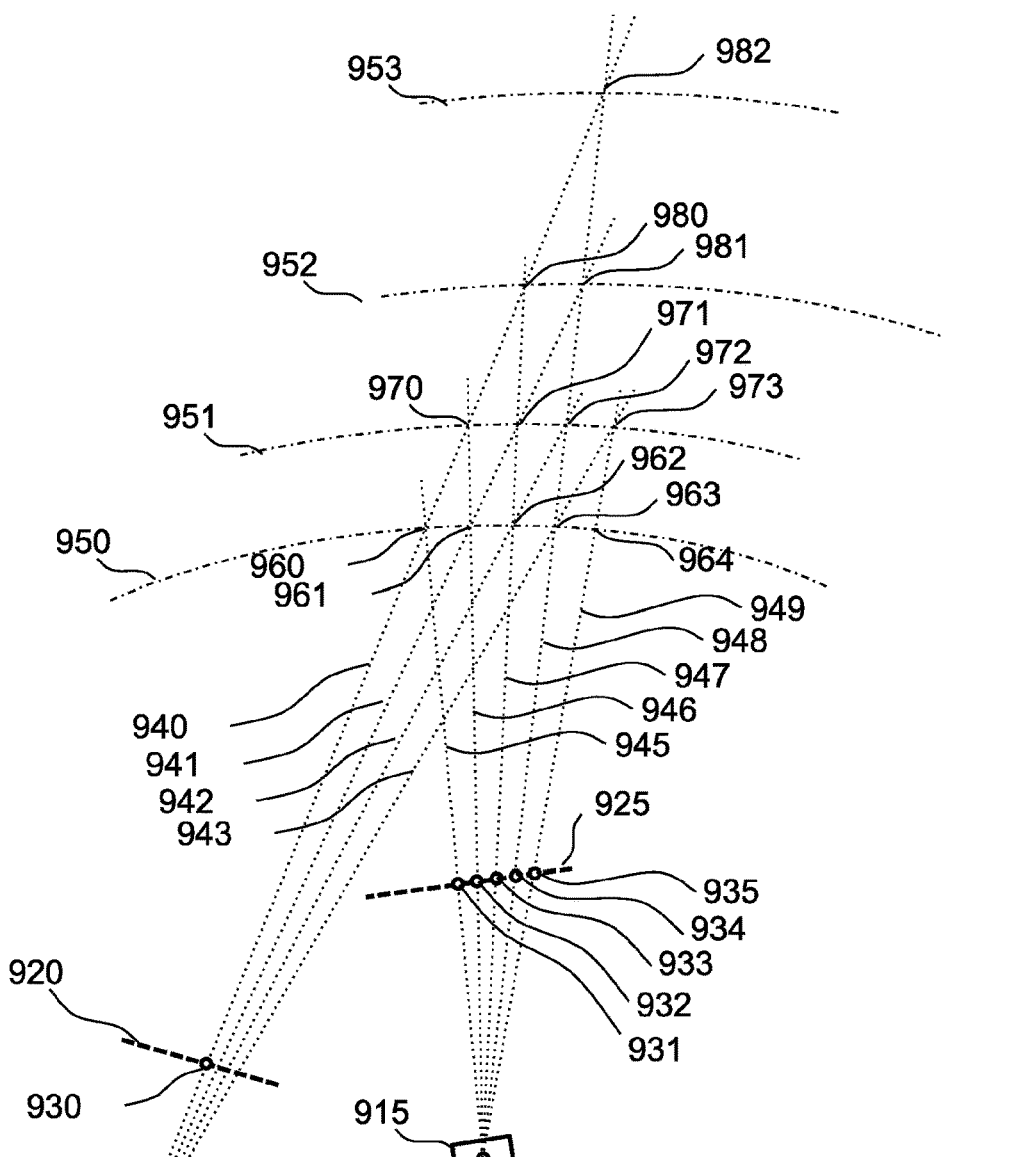
FIG. 9 is an illustration of a geometric construction for creating Consistent Depth Shift Warps for a camera pair using a curved Reference Surface.
Figure 9:
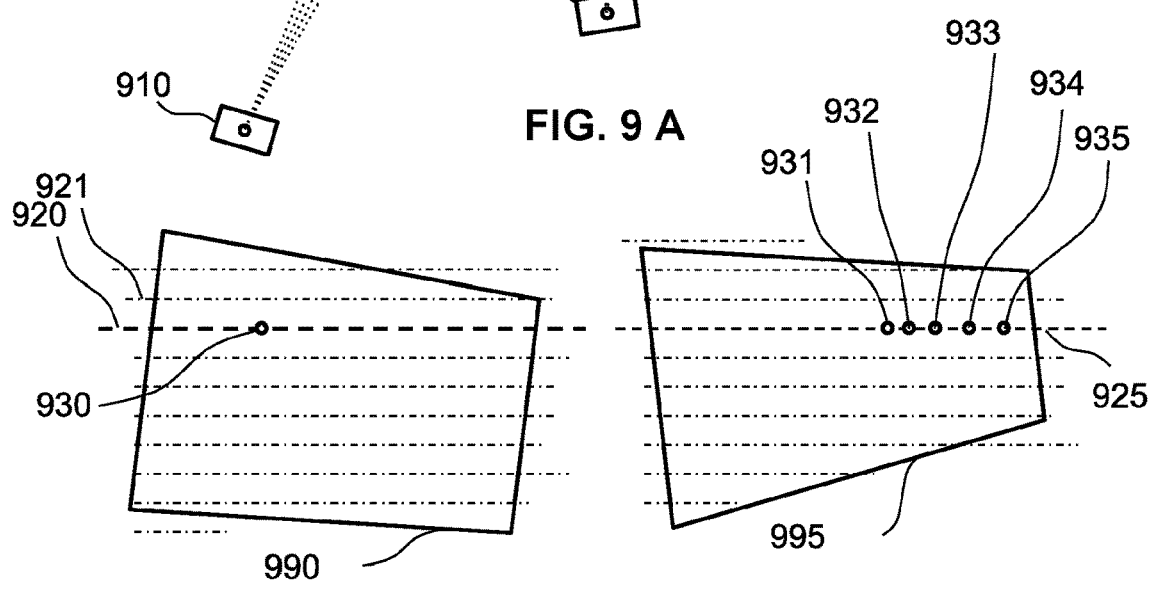

In certain embodiments, it may be advantageous to use a reference surface that is a curved 2D form extending through the 3D scene. For example, a spherical form, an ovoid form or some other suitable 2D surface embedded in the scene. FIG. 9 A illustrates the construction of Constant Depth Shift for a reference surface 950 shown as a curved, dot-dashed line. The construction within a single epipolar plane is shown at an exemplary position in FIG. 9 A (the epipolar plane is the 2D plane of the diagram similarly to FIG. 7 A) and projected onto a single scanline 920 in in the rectified image 990 (as shown in FIG. 9 B). Again, similarly to FIG. 7 A, the scanline 920 is the intersection of the epipolar plane under consideration and camera 910's image plane. This construction process may be repeated on other epipolar planes at other angles about the line between the camera centres 910, 915. Repeating the process for other epipolar planes creates a 2-dimensional image whose horizontal scanlines represent the image data extracted along the epipolar lines (shown in FIG. 9 B at for example 920, 921). The constant depth shift construction for a curved reference surface is, as shown in FIG. 9 A, analogous to the construction for a reference surface that is a flat plane as was disclosed in detail in relation to FIG. 7 A. A point 930 (FIG. 9 B lower left side) on epipolar line 920 projects to the Reference Surface at 960 and extended from the reference surface intersects a curved derived reference surface 951 at point 970. From point 970, line 946 traces back toward the camera centre 915 intersecting the reference surface 950 at a point 961. Continuing this method, the progression of a series of points 960, 961, 962, 963, 964 may be determined, which may be projected back to the epipolar line 925 forming points 931, 932, 933, 934 and 935. In general, the spacing of points 931, 932, 933, 934 and 935 (FIG. 9 B lower right side), and so forth on the epipolar line 925 may not be uniform and may be determined by the relative 3D positions of cameras 910 and 915, the position and shape of Reference Surface 950 and the position and shape of a single derived reference surface (remaining depth offsets at positions within epipolar planes between potentially numerous derived reference surfaces are defined by construction following these initial choices). There may be computational efficiency to be gained by arranging pixel locations along one or more digitised/quantised (and rectified) epipolar lines to be spaced so as to represent confluences of depths on the spaced out reference surface and set of derived reference surfaces (950, 951, 952, 953, and beyond).

Consistent Depth Shift Warp

The consistent depth shift warp performs image rectification, to images in an image pair, according to the construction for consistent depth shift images and additionally may perform compensation along the scanlines so that resulting rectified images have sufficiently high resolution as compared to the original images. The resulting pair of images may be referred to as a pair of consistent depth shift images. In certain embodiments, where appropriate the resulting pair of images may be referred to as rectified images.

A consistent depth shift warp may be represented as a two-dimensional lookup table of substantially the same (or the same) dimensions as the rectified images. Thus, for one or more pixels of the rectified image there may be a corresponding element in the stored consistent depth shift warp that records where the corresponding original pixel's pixel data (in the coordinate space of the unrectified original image) has been transformed from (in terms of the coordinate space of the rectified image).

Referring to FIG. 8, an image pair of source images 810 (FIG. 8 A) and 811 (FIG. 8 B) are shown with an even grid indicating pixel locations in the original unrectified source images. For reference epipolar lines are shown with dot-dash lines including for example lines 812 and 813. An observed point 820 is shown in image 810 and another 830 is shown in image 811. Additional points marked with circles 831, 832, 833 indicate depth shifts along the epipolar line as may be determined by the described geometric construction for generation of consistent depth shift Images. In the lower half of FIG. 8, consistent depth shift warps 840 (FIG. 8 C) and 841 (FIG. 8 D) are constructed. Again, a regular grid indicates a division of the space into elements. At one or more of such elements, the location of the source pixel in the source image for the corresponding camera of the camera pair may be stored. In certain embodiments, the location of the source pixel may be stored as integer values for the row and columns of the image data in the source image. In certain embodiments, the location of the source pixel may be stored as fixed point, floating point or other type that enables description of the location to a fraction of a pixel.

By way of example, in consistent depth shift warp 840 there is an element at 850 which contains as shown at 851 X and Y coordinates describing the location of point 820 in source image 810. The mapping from 850 to 820 may be calculated by the consideration of epipolar warping and the geometric construction for generation of consistent depth shift images disclosed herein. As a further example consider the consistent depth shift warp 841 and element 860 containing X and Y coordinates describing the location of point 830 in source image 811. In this case the coordinates may be stored as real values having a fractional part to indicate a location for the source at a sub-pixel level of accuracy. In certain embodiments, a list of one or more X, Y coordinates and associated pre-calculated weights may be stored in the consistent depth shift warp.

Applying a Warp to an Image

Given a target image and a warp 840 the process of warping a source image, e.g. 810, to a target image is to consider at least a portion of the pixels in the target image in turn. For a particular pixel in the target image, refer to the equivalent location in the warp 840 to find the source pixel location in the source image, and this process may be repeated for at least a substantial portion of the target and source pixels. From the source image, the pixel data at the source pixel location may be copied into the destination (rectified) image. In certain embodiments, the source pixel location may address to a subpixel level and the destination pixel may be written with pixel data derived from pixels in the source image in the neighbourhood of this point. In certain embodiments, a kernel may be used to sample the neighbouring pixels. In certain embodiments, a simple linear interpolation may be used to calculate pixel data representing the source image at a subpixel location. In certain embodiments, interpolation weights or kernel weights may be varied according to the location in the source image or the location in the target image to ensure the accurate (i.e. interpolated sub-pixel) assignment of pixel colour and/or other pixel-level data such as optical flow data and/or other metadata in the resulting warped image.

Exemplary Main Process

Figure 13:
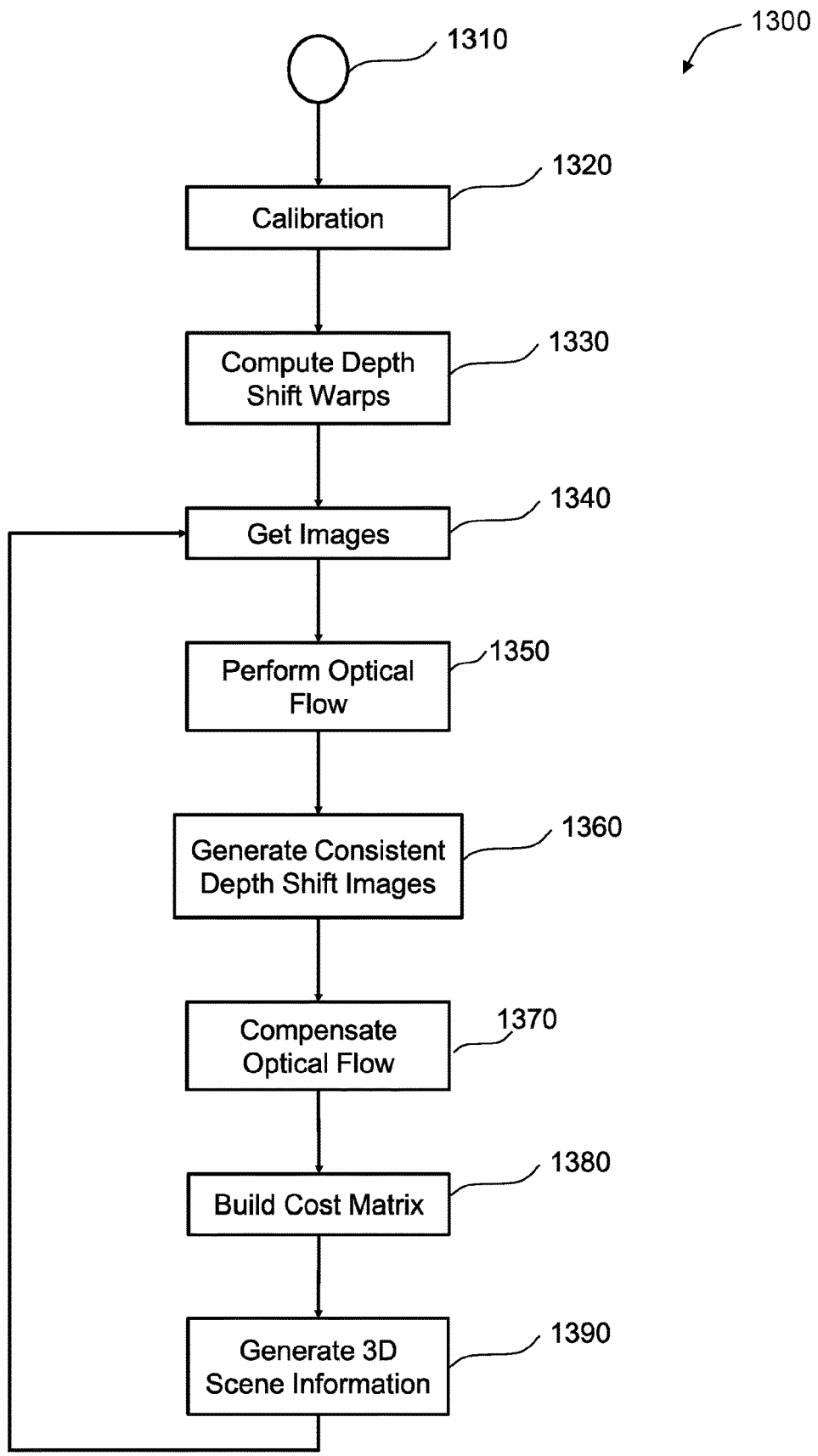
FIG. 13 is a flow chart of an exemplary process.

FIG. 13 shows a top-level flow chart 1300, according to certain embodiments. Starting from 1310 the exemplary system and/or method may proceed to perform the step Calibration 1320. Calibration 1320 involves calibration of the cameras in the camera array 110 so that later steps may operate with images that are calibrated and registered to normalize their viewpoint. As part of this step the intrinsic camera parameters and/or extrinsic camera parameters of cameras in the Camera Array 110 may be determined and may be stored for use in later processing steps. Camera calibration is a known procedure and there are number of methods that may be applied. Following Calibration 1320 flow proceeds to the step Compute Consistent Depth Shift Warps 1330.

Figure 14:
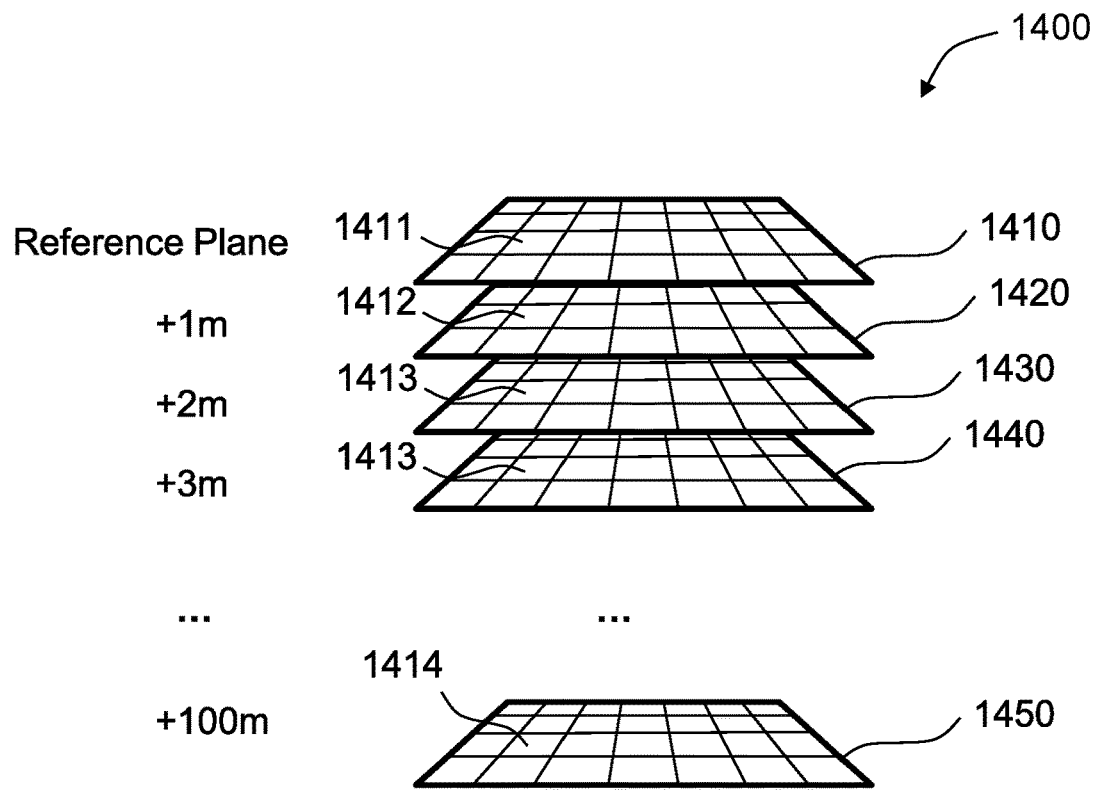
FIG. 14 is an illustration of a cost matrix.

In step Compute Consistent Depth Shift Warps 1330, camera pairs are selected from the cameras in the camera array. In certain embodiments, one or more combinations of camera pairs are stored in a data structure such as shown in FIG. 14 B as 1490. In this step the next combination of camera pair is read from the data structure. In certain embodiments, a subset of the combinations of pairs of cameras may be stored in a data structure. Pairs of cameras may be chosen based on one or more of the following: their relative position, orientation, baseline, on the focal length, resolution, spectral response, and other attributes. A consistent depth shift warp may be determined for at least one camera pair in the one or more of the selected camera pairs. The consistent depth shift warp may be derived from the intrinsic camera parameters and/or extrinsic camera parameters of the cameras in the camera pair, for example, according to the approach described in relation to FIG. 6, FIG. 7 and/or FIG. 9. The warp may take the form as described in relation to FIG. 8.

In certain embodiments, steps Calibration 1320 and/or Compute Depth Shift Warps 1330 may be performed as an initialization process, for example, when first starting the system. In certain embodiments, these steps may be performed in a one-off manufacturing process. In certain embodiments, these steps may be performed at service intervals, according to a regular maintenance schedule. In certain embodiments, these steps may be performed once, and the calibration data (that may include intrinsic camera parameters and/or extrinsic camera parameters) and consistent depth shift warps may be stored for use by other processes in the system. In certain embodiments, Calibration may be updated or generated regularly and step 1330 may be performed following calibration update to generate updated consistent depth shift warps. Following Compute Depth Shift Warps 1330 flow proceeds to step Get Images 1340.

In the step Get Images 1340 the processing engine 115 operates the camera array 110 to capture a set of substantially simultaneously captured images from cameras in the camera array 110. The camera array 110 may provide de-Bayered images to the processing engine 115. Following Get Images 1340, flow proceeds to step Perform Optical Flow 1350.

In the step Perform Optical Flow 1350, one or more current images and one or more previous images (i.e. images captured from the same camera at one or more earlier times) are processed to generate an optical flow field, i.e., a set of vectors representing the apparent local vertical and/or horizontal movement across the image of the 2D image appearance at one or more pixel locations. In certain embodiments, the optical flow field together with uncertainty bounds is calculated for a substantial portion of the pixels. These bounds may enable subsequent processing to make suitable adjustments for image regions where the local image data does not allow for sufficiently precise calculation of the apparent local movement of the 2D image appearance (this may be for example in image regions that appear as uniform colour with little or no texture information). The resulting image data now includes both spectral data (according to the image sensor sensitivities to portions of the electromagnetic spectrum) and optical flow data at a portion of the total number of pixel locations. For example, image data may comprise components for conventional colour values (i.e., RGB) and channels for optical flow components Dx, Dy representing apparent local 2D movement of the 2D image appearance at at least a portion of pixel locations. In certain embodiments, optical flow data may be represented in a different form, for example by the angle and magnitude of the local scene motion. Algorithms for performing optical flow are known in the art, for example the Horn-Schunck method and/or the Lucas & Kanade method. In certain embodiments, the optical flow may be performed as part of on-camera processing in the Camera Image Processing Unit 240 (FIG. 2). In certain embodiments, optical flow may be performed in the Processing Engine 115. Following Perform Optical Flow 1350 flow proceeds to Generate Consistent Depth Shift Images 1360.

In the step Generate Consistent Depth Shift Images 1360, the Processing Engine 115 applies the consistent depth shift warps to rectify image pairs that have been captured from the corresponding camera pairs in the camera array 110. Generally, image pairs may correspond to one of the camera pairs for which consistent depth shift warps have previously computed in step 1330. The selected image pair may be chosen by stepping through a data structure of camera pairs such as shown in FIG. 14 B as 1490. Image pairs may be chosen based on one or more of the following: the relative position, orientation, baseline of the corresponding camera pair, the focal length, resolution, spectral response, and other attributes. In certain embodiments, the selection of the image pair may be responsive to knowledge of the scene such as prior assumptions or externally supplied information of near or distant physical surfaces. For at least one selected image pair, the two images of the pair are warped by applying the corresponding consistent depth shift warp which is described elsewhere in this disclosure. The resulting pair of consistent depth shift images may be stored in association with the camera pair for use in following steps. Following Generate Consistent Depth Shift Images 1350 flow proceeds to step Compensate Optical Flow 1370.

In the step Compensate Optical Flow 1370, the optical flow data is adjusted to compensate for the warping of the images. Considering FIG. 15, on the left is illustrated an original image 1510 with epipolar lines, for example 1511, and for an example pixel location its optical flow data is shown as a vector 1512. Again, referring to FIG. 15, on the right is illustrated an image 1520 warped as by step Generate Consistent Depth Shift Images 1360 with epipolar lines, for example 1521, now running horizontally, and for an example pixel location its original optical flow vector 1522. Noting the relative change in the orientation of the epipolar lines, and the scaling of the shifts along epipolar lines, a compensated vector 1524 is shown. The compensation required for at least a substantial portion of the pixel locations may be calculated from geometric principles and may vary at different locations in the rectified image.

Figure 15:
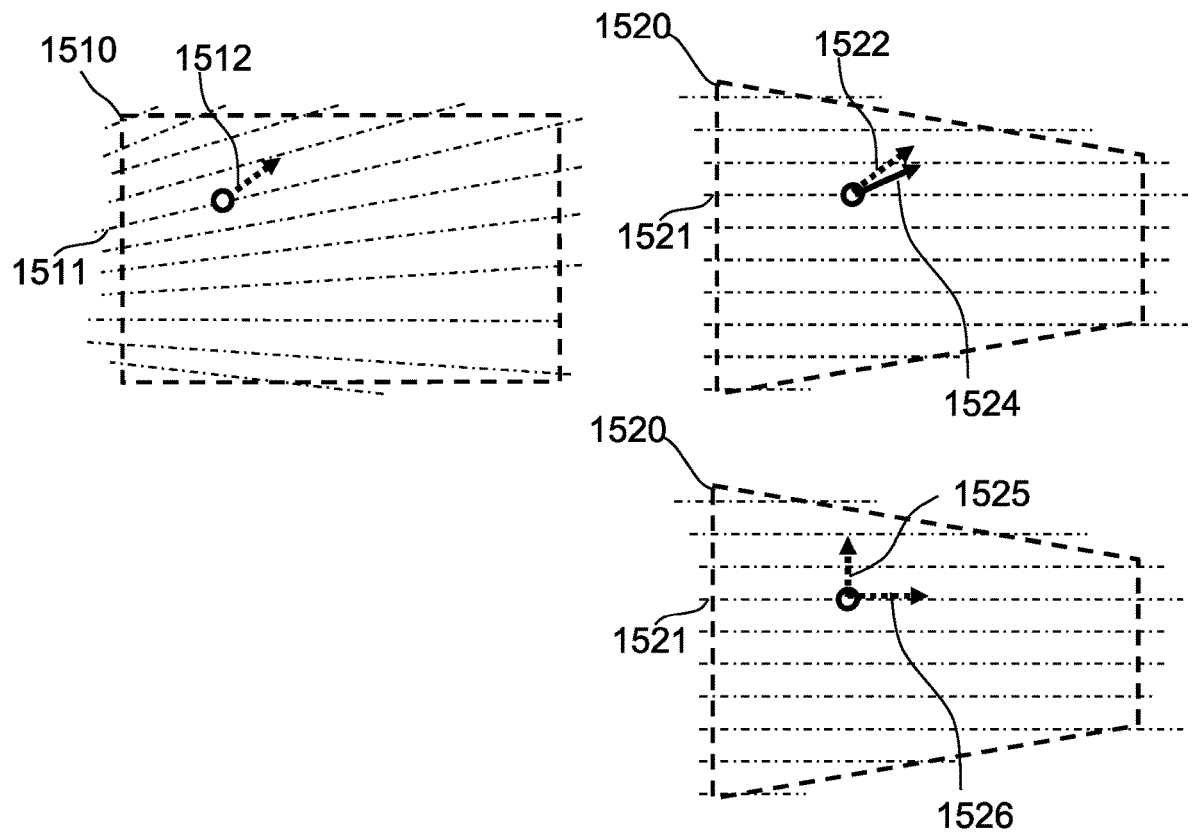
FIG. 15 is an illustration of compensation of optical flow.

In certain embodiments, optical flow data may be decomposed into the component along the epipolar line 1526 and the component perpendicular to the epipolar line 1525 (FIG. 15, lower right).

In certain embodiments, the compensation of the optical flow data is pre-calculated, for example it may be determined as part of the step Compute Depth Shift Warps 1330. Following Compensate Optical Flow 1370, flow proceeds to step Build Cost Matrix 1380.

In the step Build Cost Matrix 1380 a three-dimensional cost matrix is constructed using the pairs of image data produced in the previous steps. FIG. 14 shows a cost matrix 1400 including layers 1410, 1420, 1430, 1440 and 1450. Layers of the cost matrix may consist of a 2-dimensional grid of elements forming columns. For example, the elements 1411, 1412, 1413 and 1414 form a column though the layers of the cost matrix 1400. In certain embodiments a substantial portion of layers may be associated with a Reference Surface and a set of derived reference surfaces respectively; for example, layers 1410, 1420, 1430 and 1440 may be associated with surfaces shown in FIG. 7 A at 750, 751, 752 and 753 respectively.

Sets of intersection points constructed from different image pairs (as per FIG. 7 A) may fall at slightly different locations in the Scene. 3D neighbourhoods may be constructed around these sets of intersection points such that a substantial proportion of these 3D neighbourhoods have at least one representative intersection point from a substantial portion of the sets of intersection points constructed from the image pairs. At least a substantial portion of elements of the cost matrix are associated with at least one of these 3D neighbourhoods. For example, cost matrix element 1411 may correspond to the 3D neighbourhood that contains intersection point 760 and cost matrix element 1412 may correspond to the 3D neighbourhood that contains intersection point 770.

Figure 18:
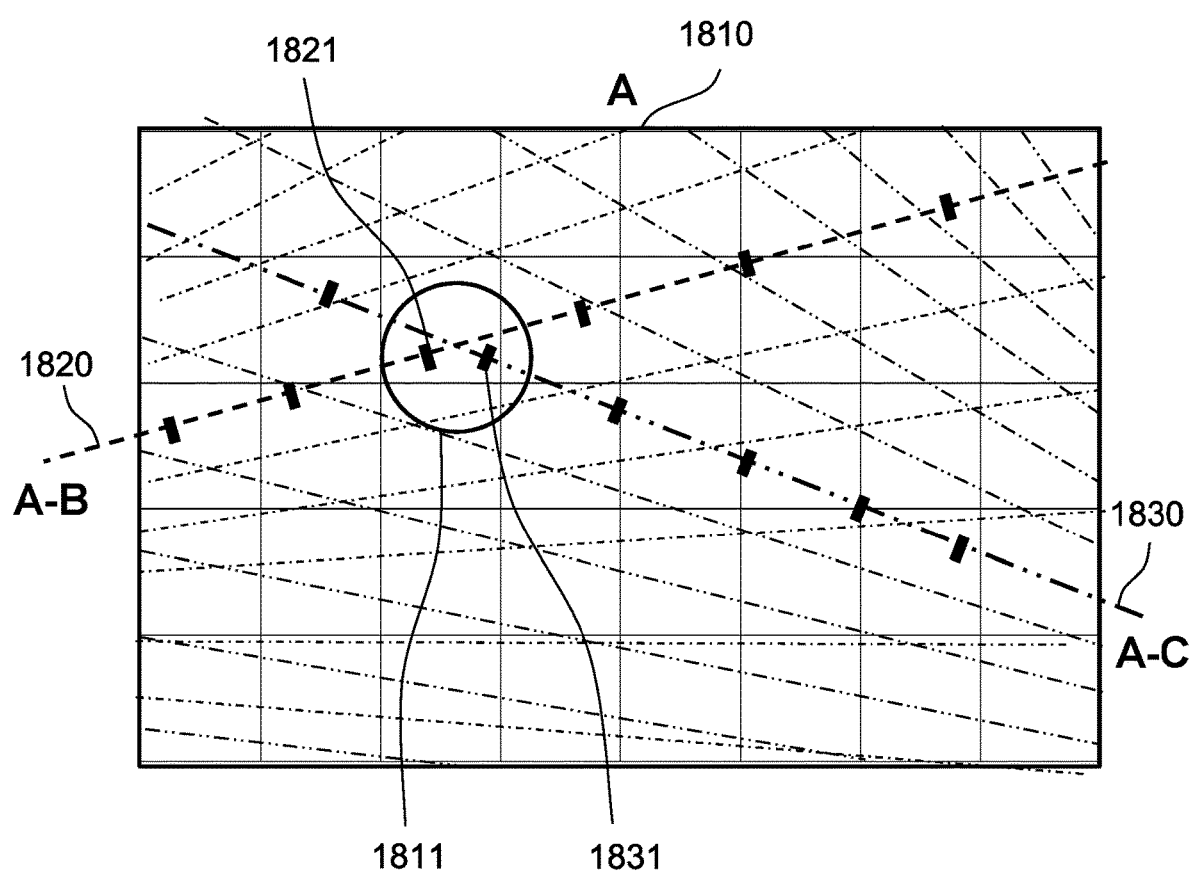
FIG. 18 is an illustration of 3D point neighbourhoods.

Referring to FIG. 18 image data for a camera "A" is shown as a rectangle 1810. A set of epipolar lines of a camera pair, comprising cameras A and B, are shown as dot-dash lines running diagonally up and to the right, including line 1820. For example, if camera B is considered that illustrated in FIG. 7 as 795, epipolar line 1820 might for example be line 725. For illustration along epipolar line 1820, heavy dash marks including 1821 indicate points on the epipolar line (for example points 731, 732, 733, 734 in FIG. 7) projected from intersection points (such as 760, 761, 762, 763 in FIG. 7). These points have corresponding pixel data from the associated rectified images (which in this case is derived from cameras A and B). Epipolar lines of another camera pair comprising cameras A and C are also shown on FIG. 18 as dot-dot-dash lines running diagonally down and to the right (including 1830). Again, for illustration, a set of heavy dash marks (including 1831) represent intersection points on the epipolar line 1830 constructed similarly to the process illustrated in FIG. 7. Again, these points have corresponding pixel data from their associated rectified images (which in this case is derived from cameras A and C).

For simplicity heavy dash marks representing intersection points on other epiploar lines are not shown on FIG. 18.

For example on epipolar lines 1820 and 1830, marks 1821, 1831 may represent intersection points substantially on the reference plane (e.g., 750, FIG. 7 A) and, as exemplified by 1821 and 1831, intersection points from different camera pairs may not precisely coincide. While illustrated in FIG. 18 with only two camera pairs, if in certain embodiments there were N cameras there would be N−1 camera pairings that include camera A and consequently N−1 intersection points that may be mapped out over a desired reference surface or derived reference surface. Considering at least one reference surface (FIG. 18 being an example when considering Reference Plane 750), sets of nearby intersection points constructed substantially on or nearby this surface from different image pairs, may be collected into 3D neighbourhoods as illustrated for example by circle 1811. Example neighbourhood 1811, which may be any suitable shape but illustrated for simplicity as a circle, represents a 3D neighbourhood that contains at least intersection point 1821 (from camera pair A-B) and intersection point 1831 (from camera pair A-C). If there were more cameras available, additional intersection points may be added to one or more 3D neighbourhoods. For example, a system with 4 cameras may have 3 such intersection points collected into substantially each of the 3D neighbourhoods thus constructed. A system configured with 16 cameras may have 15 points in substantially each of its 3D neighbourhoods.

In certain embodiments, there may be significant advantages to constructing 3D neighbourhoods around clusters of these intersection points that have minimal spatial extents, as the pixel data from intersection points collected from such a 3D neighbourhood may more accurately reflect whether a physical surface intersects the actual 3D physical space represented by the 3D neighbourhood. For example, collected pixel data from a 3D neighbourhood that are substantially the same colour may provide evidence there is a physical surface present within the physical region in the scene represented by that 3D neighbourhood.

In certain embodiments, 3D neighbourhoods may be determined by a fixed division of the reference plane into squares, hexagons or other suitable shapes.

In certain embodiments, the mapping from 3D neighbourhoods to pixels in the image data, for camera pairs, is pre-computed. In certain embodiments, the mapping may be retrieved by querying a suitable data structure such as a lookup table.

The proximity of the intersection points in 3D point neighbourhoods means that their collective spectral data and/or optical flow data may be used to assess the likelihood that a physical surface is present at a 3D location representative of the 3D neighbourhood i.e., the more consistent the spectral data and/or the optical flow data across the points in the neighbourhood the more likely a physical surface exists at the 3D location of the neighbourhood.

To build the cost matrix 1400, columns of the cost matrix may be considered in turn. Starting with a cost matrix element in the first layer 1410, say element 1411, for the intersection points in the 3D neighbourhood associated with this cost matrix element the associated rectified image pixel data is retrieved. The location of the image pixel data may be found by using a look-up table precomputed from geometric considerations of the locations of the cameras and the 3D neighbourhood. From this pixel data a cost value is determined as is described elsewhere and stored into the associated element of the cost matrix. Additional information may also be stored in the associated element of the cost matrix for convenient reference in subsequent processing. The additional data may be summarised spectral and/or velocity information that characterises the points in the 3D neighbourhood.

Following the determination of a cost value for element 1411 in the first layer (1410) of the cost matrix, the next element in the column of cost elements may be determined. Given the same camera pairs and same initial location of the image pixel data as was used for the cost matrix element in the top layer, subsequent cost matrix elements in the same column of the cost matrix may be determined by adjusting the first pixel location along the scanline of the first rectified image or the second pixel location along the scanline of the second rectified image, according to the desired cost matrix element which in turn is associated with a particular depth in the scene. Again, a cost value is calculated, and may be written into the cost matrix 1400 at element 1412 in the next layer 1420. This process is repeated to determine cost values for a substantial portion of the elements in the cost matrix 1400.

The cost value recorded into a substantial portion of the elements of the cost matrix depends on the spectral data and/or optical flow data associated with the points of the 3D neighbourhood associated with it. In certain embodiments, the pixel data used for the computation of the cost value may include spectral data (for example, luminance data, colour data, data as RGB components, and/or data as YUV components) and/or pixel optical flow data (for example, apparent vertical pixel motion and/or apparent horizontal pixel motion). In certain embodiments, the computation of the cost value may in part depend on a weighting to be applied to at least some of the pixel data associated with the points in the neighbourhood. In certain embodiments, the weighting may be based on the distance between points in the neighbourhood and a representative 3D point of the 3D neighborhood (non-limiting examples of such a representative point are the 3D mean or geometric median of the points in the neighbourhood, or the centroid of the 3D neighbourhood). In certain embodiments, the velocity may be used in the determination of a cost value. In certain embodiments, the computation to determine the cost may be one or more of the following operations performed on the collective pixel data associated with at least one of the 3D points in the 3D neighbourhood: a linear combination, a nonlinear computation, using pre-computed look-up table(s) to return a value, and using neural networks. In certain embodiments, the computation to determine the cost in matrix elements may, in addition, to the pixel data of the 3D neighbourhood associated with it, take into account the pixel data of 3D neighbourhoods associated with neighbouring matrix elements. The cost values, written into the elements of the cost matrix may represent a nominal cost for assuming there is a physical surface present in the scene at the 3D location of the 3D neighbourhood associated with that element. In certain embodiments, the cost value is a numeric value greater or equal to zero.

To compute the cost matrix efficiently (i.e., minimal computational operations), it may be convenient to ensure the reference surfaces and derived reference surfaces from different camera pairs are substantially aligned. From geometric principles it may be seen that 3D neighbourhoods of minimal extent may be constructed based on a mapping that records across a single reference surface (for example 750) a single offset per location (for example the shift from 1821 to 1831) if the reference surface and derived reference surfaces (750, 751, 752, 753 and so forth) are common to substantially all image pairs whose intersection points (e.g., FIG. 7, A: 760, 761, 762, 763, 764, 770, 771, 772, 773, 780, 781, 782 etc) may be included in the 3D neighbourhoods and which thereby form the basis of sets of pixel data in 3D neighbourhoods that may be then used to compute the values in the associated elements in the cost matrix.

There may be advantages to arranging the intersection points in a portion of 3D neighbourhoods in this manner, as a computing device may then be able to retrieve the necessary pixel data from rectified images with fewer accesses to digital memory, and may consequently be able to compute the cost matrix more efficient because fewer operations may be needed. The geometric constructions disclosed herein that permit pixel data for cost matrix entries to be extracted from rectified images using substantially constant offsets may further permit computing devices to calculate the cost matrix entries with fewer operations and/or accesses to digital memory.

Without the rectification processes disclosed herein, extracting pixel data from multiple cameras that represent light emanating from selected 3D neighbourhoods in the physical scene in order to calculate entries in a cost matrix may require, because of the unconstrained geometric positioning of the cameras, unique calculations for each camera pair and for each cost matrix element. If these calculations were at least a linear combination of raw camera pixel data with a set of unique parameters, the number of operations a computing device might have to perform for each cost matrix element might be N (the number of cameras in the system) times larger, and the number of accesses to digital memory D (the number of planes in the cost matrix stack) times larger than when using the method outlined in this disclosure. For example, a system configured with 4 cameras and 1000 candidate depth planes in its cost matrix may require 4 times more operations and 1000 times more memory accesses; potentially resulting in significantly slower operation. Using the one or more of the rectification processes disclosed herein, the number of operations and/or the number of memory accesses may be reduced.

Notwithstanding the above advantages, in certain embodiments, it may be beneficial to base rectifications and neighbourhood construction around a common reference surface (for example 750), but to determine the derived reference surfaces (for example 751, 752, 753 and so forth) independently for one or more camera pairs. In certain embodiments, instead of being fixed the derived surfaces' spacing may be varied for one or more camera pairs to achieve a desired spatial resolution across pairs of rectified images. In certain embodiments, the spatial resolution of the consistent depth shift images may be at least 100, 200, 400, 800, 1000, 1500, 2000, 4000, 8000, or 16000 samples. In certain embodiments, there may be an efficient mapping between the rectified image data based upon the independently selected reference surfaces and the rectified image data based upon the common reference surfaces. In certain embodiments this mapping may be incorporated into step Build Cost Matrix 1380 (and also step Perform Optical Flow 1370 if used) by storing rectified image data based on the independently selected reference surfaces in a suitable associated data structure. In some embodiments, storing the rectified image data based on the independently selected reference surfaces may have the advantage of permitting a more accurate computation of the rectified image data than if based upon the common reference surfaces, but without undue additional computational cost.

Following the step Build Cost Matrix 1380, flow proceeds to the step Generate 3D Scene Information 1390. At Generate 3D Scene Information 1390 the cost matrix built in the previous steps may be used to determine 3D Scene Information which may be stored in a 3D Information data structure.

The 3D Information may be calculated by optimally computing a minimal total cost along a series of linear directions using (one dimensional) dynamic programming methods, for example 1-D dynamic time warping or 1-D scanline optimization. In some embodiments, the path with the optimal total cost may comprise a collected set of 3D neighbourhoods that are most likely to represent a path along a physical surface in the scene, and thereby reveal more accurate depth estimates than by considering each 3D neighbourhood in isolation. In some embodiments, linear optimisations performed along lines substantially aligned to one or more of the epipolar planes (of those available as a consequence of the set of image pairs chosen) may provide more accurate optimal paths than lines not such aligned. One explanation may be due to the fact that, except for cases of occlusion in the scene, corresponding pixels in an image pair of positions on physical surfaces in the scene may be found along epipolar lines. As a consequence, for example, with at least one contribution amongst the collected pixel data for a 3D neighbourhood being from a physical surface, the path along the epipolar line that includes this 3D neighbourhood is more likely to be identified as the optimal one.

In some embodiments, the computational effort of calculating the cost matrix values may be greater than the computational effort of performing linear depth optimisations, and so it may be useful to extract more accurate depth values by performing optimisations along multiple lines and exploit the fact that in a substantial number of such optimal path calculations the cost matrix values may be reused in subsequent optimisation processes and not recalculated. In some embodiments, the multiple lines may align to one or more of the epipolar lines that correspond to one or more of the image pairs chosen.

In some embodiments, the combination of a plurality of depth estimates produced by multiple optimal path computations may facilitate more accurate depth estimates than one such optimal path calculation. For example, by allowing the use of robust statistical measures to produce a refined depth value from the set of depth values produced by the at least one optimal path calculation.

Howsoever derived the depths for at least a substantial portion of the locations may be written into a 3D information data structure together with additional associated data which may include summarized spectral and/or velocity information.

In certain embodiments, the 3D information data structure may be arranged as a depth map having a 2D grid of elements each representing a portion of the scene projected into a view. These elements may each store depth, and may additionally store spectral data, optical flow data, and/or other metadata associated with that portion of the scene. In certain embodiments, the 3D information data structure may be arranged as a point cloud: i.e., a set of 3D points that collectively represent an approximation to the physical surfaces or objects in a scene. The 3D points in the point cloud may additionally contain spectral data, optical flow data, and/or other associated metadata.

The 3D scene information data structure, or the information it contains may be output from the processing engine 115 to external systems by the communication bus 181 (FIG. 1).

Following Generate 3D Scene Information 1390 flow proceeds to back to step Get Images 1330 where the process may continue in a loop for an extended period of time or until it is shutdown or otherwise interrupted. Thus, by repeating steps from 1340 to 1390 a stream of 3D Scene Information may be output.

Exemplary Main Process—Alternative Without Optical Flow

Figure 16:
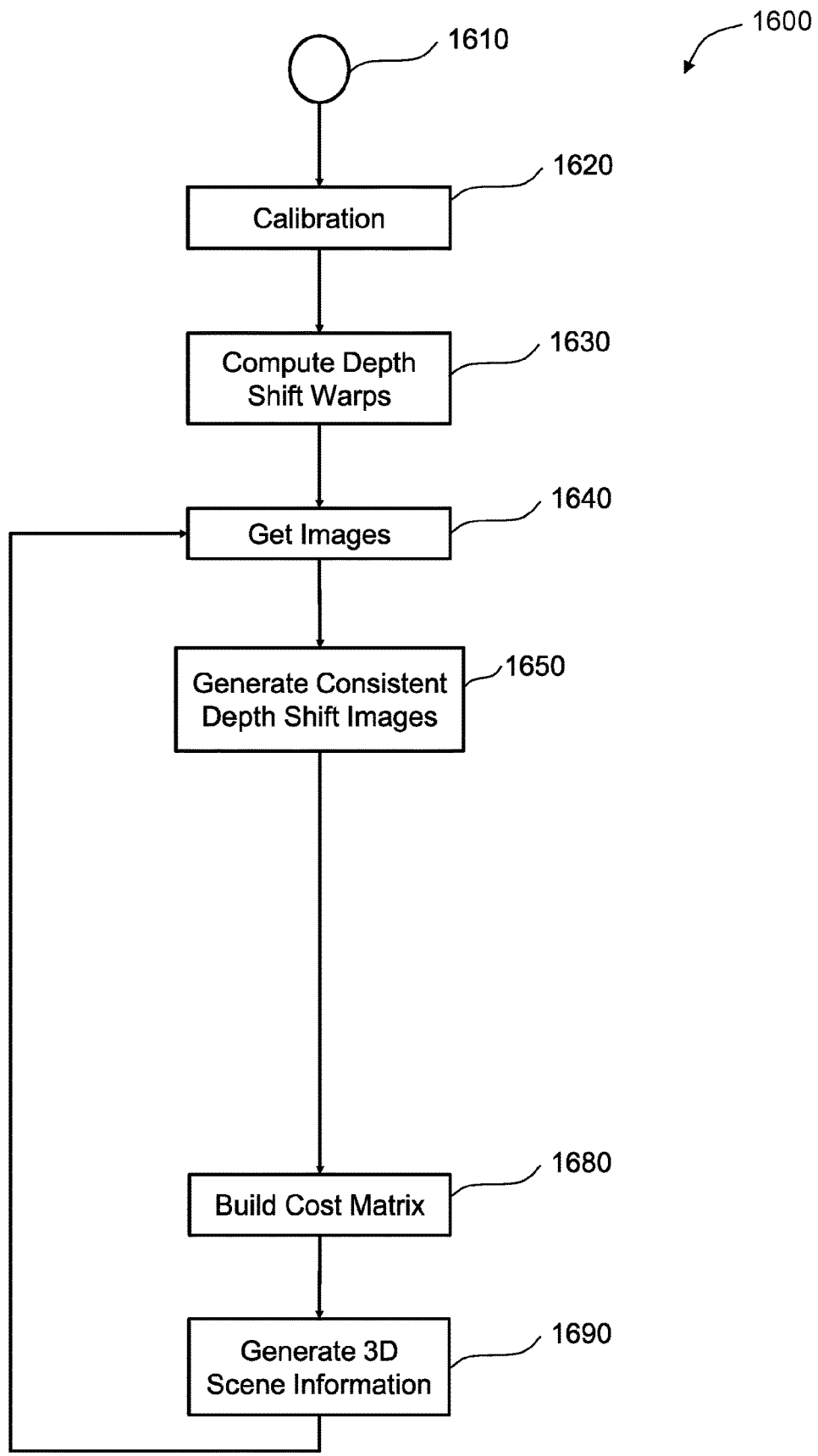
FIG. 16 is a flow chart of an alternative exemplary process.

In certain embodiments, 3D Scene Information is generated without use of optical flow data. Referring to FIG. 16 and flow chart 1600 processing starts at 1610. The steps 1620, 1630 and 1640 are as described in the Exemplary Main Process and FIG. 13 respectively as 1320, 1330 and 1340 and will not be described further.

The operation of step Generate Consistent Depth Shift Images 1660 is as described with respect to step 1360 (FIG. 13) excepting that the images processed may not contain optical flow data. From step 1660 flow proceeds to step Build Cost Matrix 1380.

The operation of step Build Cost Matrix 1680 is as described with respect to step 1380 (FIG. 13) excepting that optical flow data may not be used in building the cost matrix, so for example the cost values may not have contributions from optical flow data including derived information such as vertical pixel motion. From step Build Cost Matrix 1680 flow proceeds to step Generate 3D Scene Information 1690.

The operation of step Generate 3D Scene Information 1690 is as described with respect to step Generate 3D Scene Information 1380 (FIG. 13) excepting that optical flow data may not be used to determine 3D velocity data. From step Generate 3D Scene Information 1690 flow passes again to Get Images 1640.

Exemplary Main Process—Optical Flow Performed after Image Warping

Figure 17:
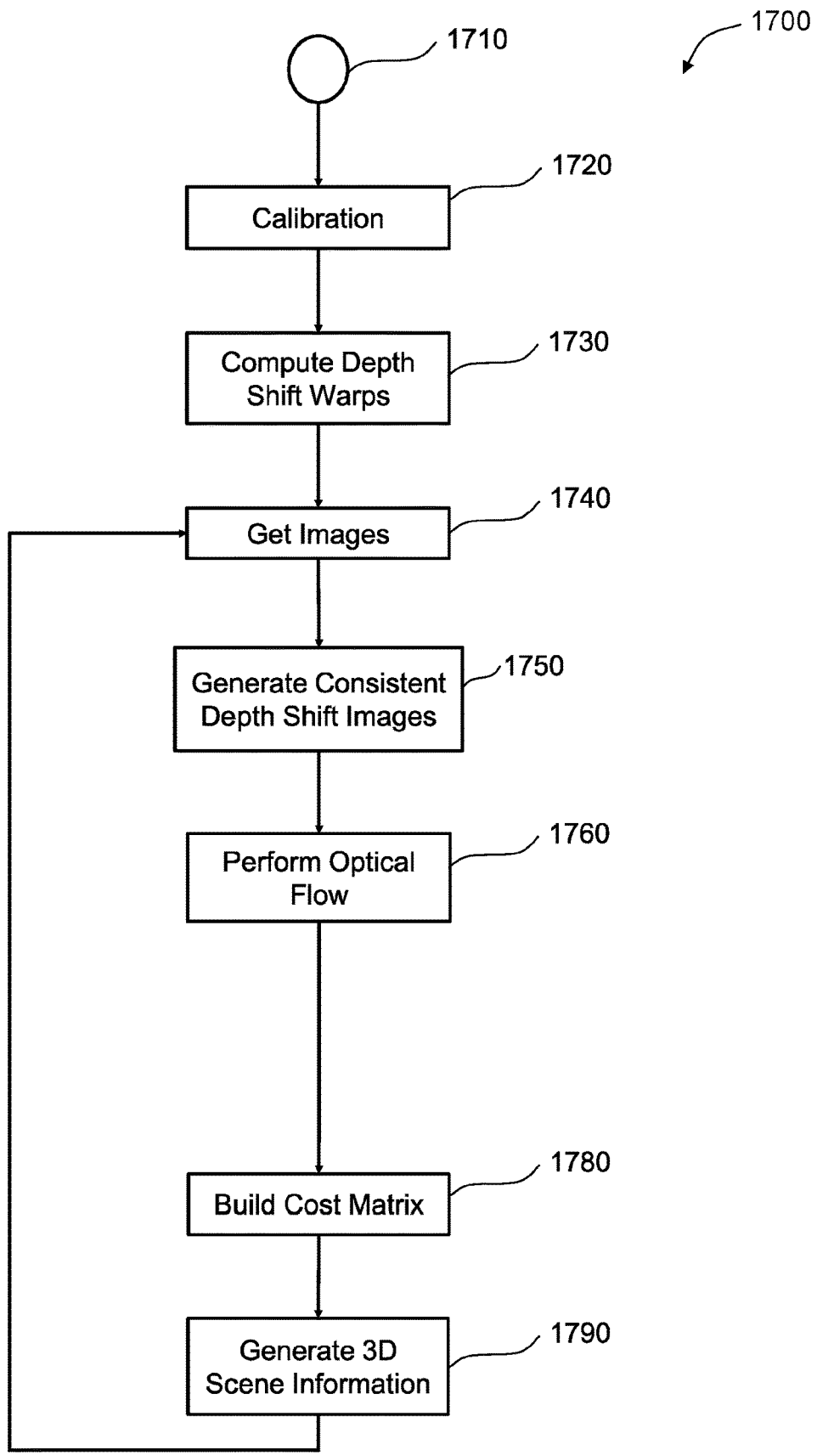
FIG. 17 is a flow chart of an alternative exemplary process.

In certain embodiments optical flow processing may be performed following image warping. Referring to FIG. 17 and flow chart 1700 processing starts at 1710. The steps 1620, 1630 and 1640 are as described in the Exemplary Main Process and FIG. 13 respectively as 1320, 1330, and 1340 and will not be described further. From step Get Images 1740 flow proceeds to Generate Consistent Depth Shift Images 1760.

The operation of step Generate Consistent Depth Shift Images 1750 is as described with respect to step Generate Consistent Depth Shift Images 1360 (FIG. 13) excepting that the images processed may not contain optical flow data. From step 1750 flow proceeds to step Perform Optical Flow 1760.

The operation of step Perform Optical Flow 1760 is as described with respect to step 1380 (FIG. 13) excepting that optical flow is performed on the Consistent Depth Shift Images (i.e. rectified images) arising from the previous step, thus optical flow is used to determine the local apparent movement of the rectified image appearance. From step Perform Optical Flow 1760 flow proceeds to step Build Cost Matrix 1780.

The steps 1780 and 1790 are as described in the Exemplary Main Process and FIG. 13 and will not be described further.

Further Advantages

Further advantages of the claimed subject matter will become apparent from the following examples describing certain embodiments of the claimed subject matter.

1. A system for generating three-dimensional information of a real-life scene comprising:
   a camera array made up of a plurality of cameras, the camera array configured to be positioned to view the real-life scene;
   the plurality of cameras comprising: at least a first camera that is configured to collect spectral data from a first field of view of the real-life scene; at least a second camera that is configured to collect spectral data from a second field of view of the real-life scene; at least a third camera that is configured to collect spectral data from a third field of view of the real-life scene; and at least a fourth camera that is configured to collect spectral data from a fourth field of view of the real-life scene;
   the first camera configured to generate at least a first image from the first field of view; the second camera configured to generate at least a second image from the second field of view; the third camera configured to generate at least a third image from the third field of view; and the fourth camera configured to generate at least a fourth image from the fourth field of view;
   the camera array being configured to transmit the first image, the second image, the third image, and the fourth image to a processing engine; and
   the processing engine is configured to:
   obtain image data from the plurality of cameras including the first camera, the second camera, the third camera, and the fourth camera;
   generate a representation of a 3D volume representative at least in part of a portion of the real-life scene by extracting associated pixel data that is selected from at least a substantial portion of the pixel data based on the projection of the 3D volume in at least one of the camera images; and
   using the associated pixel data to determine the likelihood that the 3D volume contains a physical surface.

2. The system of example 1, wherein one or more of the 3D volumes are one or more 3D neighborhoods.

3. The system of examples 1 or 2, wherein the 3D volume is a 3D neighborhood.

4. The system of any of examples 1 to 3, wherein the associated pixel data includes 3D volume's pixel-level spectral data.

5. The system of any of examples 1 to 4, wherein the associated pixel data includes optical flow information.

6. The system of any of examples 1 to 5, wherein the associated pixel data includes 3D volume's pixel-level spectral data and 3D volume's pixel-level optical flow information.

7. The system of any of examples 1 to 6, wherein the processing engine is configured to use the associated pixel data to determine an estimated velocity for the physical surface.

8. The system of any of examples 1 to 7, wherein the associated pixel data is a subset of pixel data that comprise the pixel-level data of the first 3D volume.

9. The system of any of examples 1 to 8, wherein the associated pixel data is weighted by the distances between pixel locations associated with the pixel data and the projection of a 3D point representative the first 3D volume onto the image plane of at least one of the images.

10. The system of any of examples 1 to 9, wherein at least one representative 3D point is selected from within the 3D volume and the weighting placed on the pixel data from at least one pixel location is at least partially dependent on the proximity of the at least one pixel location to the projection of the at least one representative 3D point onto the image plane from which the at least one pixel location was selected.

11. The system is configured to determine the presence of one or more surfaces in a 3D scene by processing multiple 3D volumes using any of the systems in any of examples 1 to 10 to determine the likelihood of a surface within at least one 3D volume, and collect at least a portion of these results into an accumulated dataset.

12. The system of example 11, wherein the multiple 3D volumes do not overlap.

13. The system of example 11, wherein the multiple 3D volumes do at least partially overlap.

14. The system of any of examples 10 to 12, wherein the multiple 3D volumes do not in aggregate cover the real-life scene in its entirety.

15. The system of any of examples 1 to 14, wherein at least a portion of the multiple 3D volumes are substantially centred along at least one line projecting into the real-life scene from at least one 3D point relative to one or more of the plurality of cameras.

16. The system of any of examples 1 to 15, wherein at least a portion of the multiple 3D volumes are substantially aligned along at least one line projecting into the real-life scene from at least one 3D point relative to one or more of the plurality of cameras.

17. The system of any of examples 1 to 16, wherein at least a portion of the multiple 3D volumes substantially centred along a plurality of lines projecting into the real-life scene from at least one 3D point relative to one or more of the plurality of cameras.

18. The system of any of examples 1 to 17, wherein at least a portion of the multiple 3D volumes are substantially aligned along a plurality of lines projecting into the real-life scene from at least one 3D point relative to one or more of the plurality of cameras.

19. The system of any of the examples 1 to 18, wherein data collected within at least a portion of the multiple 3D volumes is used to determine the likelihood that the physical surface is at least partially contained within the one or more 3D neighbourhoods.

20. The system of any of the examples 1 to 19, wherein data collected within at least a portion of a set of 3D volumes is used to determine the likelihood that the physical surface is at least partially contained within the set of 3D volumes.

21. The system of example 20, wherein the set of 3D volumes is representative of a line passing through the real-life scene.

22. The system of any of the examples 1 to 21, wherein cost matrix values are used in an optimization calculation to obtain an optimized cost path comprised of 3D volumes most likely to contain physical surfaces.

23. The system of any of examples 1 to 22, wherein already calculated likelihood calculations within a cost matrix is used at least in part for subsequent optimization calculations along at least one additional line across one or more selected images.

24. The system of any of examples 1 to 23, wherein likelihood calculations within a portion of 3D volumes produce numeric results that are independent of an order in which at least a portion of the data from intersection points derived from a set of image pairs is processed.

25. The system of any of examples 1 to 24, wherein the optimization calculation is repeated for a plurality of lines derived from selected image pairs.

26. The system any of examples 1 to 25, wherein the plurality of lines is selected from epipolar lines.

27. The system any of examples 1 to 26, wherein a portion of the plurality of lines is selected from epipolar lines.

28. The system of any of examples 1 to 27, wherein already calculated likelihood calculations within the cost matrix are used at least in part for subsequent optimization calculations along at least one additional line across one or more selected images.

29. The system of any of examples 1 to 28, wherein likelihood calculations within a portion of 3D volumes produce numeric results that are independent of an order in which at least a portion of the data from intersection points derived from the set of image pairs is processed.

30. The system of any of examples 1 to 29, wherein the data associated with intersection points that are input into the likelihood calculations for the one or more 3D neighbourhoods that are associated with 3D scene information substantially aligned on at least one reference surface is calculated from the associated pixel data extracted from at least two rectified images separated by a pixel offset.

31. The system of any of the examples 1 to 30, wherein the pixel offset is constant.

32. The system of any of the examples 1 to 31, wherein the pixel offset is substantially constant.

33. The system of any of the examples 1 to 32, wherein the pixel offset is not constant.

34. The system of any of the examples 1 to 33, wherein the pixel offset is not substantially constant.

35. The system of any of the examples 1 to 34, wherein a portion of the pixel offsets are constant.

36. The system of any of the examples 1 to 35, wherein a portion of the pixel offsets are substantially constant.

37. The system of any of the examples 1 to 36, wherein a portion of the pixel offsets are not constant.

38. The system of any of the examples 1 to 37, wherein a portion of the pixel offsets are not substantially constant.

39. The system of any of the examples 1 to 38, wherein a substantial portion of the pixel offsets are constant.

40. The system of any of the examples 1 to 39, wherein a substantial portion of the pixel offsets are substantially constant.

41. The system of any of the examples 1 to 40, wherein a substantial portion of the pixel offsets are not constant.

42. The system of any of the examples 1 to 41, wherein a substantial portion of the pixel offsets are not substantially constant.

43. The system of any of examples 1 to 42, wherein the system is calibrated before operation of the system.

44. The system of any of examples 1 to 43, wherein the system is calibrated during operation of the system.

45. The system of any of examples 1 to 44, wherein at least the first camera and the second camera are calibrated with respect to one or more intrinsic camera parameters, one or more extrinsic camera parameters, or combinations thereof.

46. The system of any of examples 1 to 45, wherein intrinsic camera parameters include one or more of the following: the field of view, focal length, the image center, compensation for radial lens distortion, and other distortions.

47. The system of any of examples 1 to 46, wherein intrinsic camera parameters include one or more of the following: the field of view, focal length, the image center, compensation for radial lens distortion, and other distortions.

48. The system of any of examples 1 to 47, wherein extrinsic camera parameters include one or more of the following: camera location and camera orientation in space with respect to a designated frame of reference.

49. The system of any of examples 1 to 48, wherein the plurality of cameras in the camera array are not arranged on a single plane.

50. The system of any of examples 1 to 51, wherein one or more cameras of the plurality of cameras in the camera array are arranged in one or more planes.

51. The system of any of examples 1 to 50, wherein not all the cameras in the camera array produce image data that represents the scene with the same set of spectral bands.

52. The system of any of examples 1 to 51, wherein the systems is configured of generating three-dimensional information in real-time.

53. The system of any of examples 1 to 52, wherein the systems is configured to generate three-dimensional information at real-time frame rates.

54. The system of any of examples 1 to 53, wherein the multiple 3D volumes are substantially centred or substantially aligned along at least one line projecting into the scene from at least one pre-determined fixed 3D point relative to the cameras in the camera array.

55. A method for generating three-dimensional video information using any of the systems in examples 1 to 54.

56. One or more computer-readable non-transitory storage media embodying software that is operable when executed to implement any of examples 1 to 54.

Any description of prior art documents herein, or statements herein derived from or based on those documents, is not an admission that the documents or derived statements are part of the common general knowledge of the relevant art.

While certain embodiments have been shown and described herein, it will be obvious to those skilled in the art that such embodiments are provided by way of example only.

In the foregoing description of certain embodiments, specific terminology has been resorted to for the sake of clarity. However, the disclosure is not intended to be limited to the specific terms so selected, and it is to be understood that a specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It is to be understood that the present disclosure is not limited to the disclosed embodiments, and is intended to cover various modifications and equivalent arrangements included within the spirit and scope of the present disclosure. Also, the various embodiments described above may be implemented in conjunction with other embodiments, e.g., aspects of one embodiment may be combined with aspects of another embodiment to realize yet other embodiments. Further, independent features of a given embodiment may constitute an additional embodiment.

The invention claimed is:

1. A system for generating three-dimensional information of a real-life scene comprising:
a camera array made up of a plurality of cameras, the camera array configured to be positioned to view the real-life scene;
the plurality of cameras comprising:
a first optical camera that is configured to collect spectral data from a first field of view of the real-life scene;
a second optical camera that is configured to collect spectral data from a second field of view of the real-life scene;
a third optical camera that is configured to collect spectral data from a third field of view of the real-life scene; and
a fourth optical camera that is configured to collect spectral data from a fourth field of view of the real-life scene;
the first optical camera configured to generate at least a first image from the first field of view;
the second optical camera configured to generate at least a second image from the second field of view;
the third optical camera configured to generate at least a third image from the third field of view; and
the fourth optical camera configured to generate at least a fourth image from the fourth field of view,
the camera array being configured to transmit camera images comprising the first image, the second image, the third image, and the fourth image to a processing engine; and
the processing engine is configured to:
obtain 2D image data from the plurality of cameras including the first optical camera, the second optical camera, the third optical camera, and the fourth optical camera;
generate a representation of a 3D volume representative at least in part of a portion of the real-life scene by extracting pixel data associated with the 2D image data, the pixel data being selected from at least a substantial portion of the pixel data based on a projection of the 3D volume in at least one of the camera images; and
using the pixel data to determine a likelihood that the 3D volume contains a physical surface.

2. The system of claim 1, further comprising generating a plurality of 3D volumes, wherein one or more of the 3D volumes are one or more 3D neighborhoods.

3. The system of claim 1, wherein the 3D volume is a 3D neighborhood.

4. The system of claim 1, wherein the pixel data includes 3D volume's pixel-level spectral data.

5. The system of claim 1, wherein the pixel data includes optical flow information.

6. The system of claim 1, wherein the processing engine is configured to use the pixel data to determine an estimated velocity for the physical surface.

7. The system of claim 1, wherein the pixel data is a subset of pixel data that comprise pixel-level data of a first 3D volume.

8. The system of claim 1, wherein already calculated likelihood calculations within a cost matrix is used at least in part for a subsequent optimization calculation along at least one additional line across one or more selected images.

9. The system of claim 8, wherein the optimization calculation is repeated for a plurality of lines derived from selected image pairs.

10. The system of claim 9, wherein a portion of the plurality of lines is selected from epipolar lines.

11. The system of claim 1, wherein likelihood calculations within a portion of 3D volumes produce numeric results that are independent of an order in which at least a portion of the data from intersection points derived from a set of image pairs is processed.

12. The system of claim 11, wherein the data associated with intersection points that are input into the likelihood calculations for one or more 3D neighborhoods that are associated with 3D scene information substantially aligned on at least one reference surface is calculated from the pixel data extracted from at least two rectified images separated by a pixel offset.

13. The system of claim 12, wherein the pixel offset is constant.

14. The system of claim 1, wherein data collected within at least a portion of a set of 3D volumes is used to determine the likelihood that the physical surface is at least partially contained within the set of 3D volumes.

15. The system of claim 14, wherein the set of 3D volumes is representative of a line passing through the real-life scene.

16. A system configured to determine a presence of one or more surfaces in a 3D scene by processing multiple 3D volumes using the system of claim 1 to determine the likelihood of a surface within at least one 3D volume, and collect at least a portion of these results into an accumulated dataset.

17. The system of claim 16, wherein the multiple 3D volumes do not overlap.

18. The system of claim 16, wherein the multiple 3D volumes do at least partially overlap.

19. The system of claim 16, wherein the multiple 3D volumes do not in aggregate cover the real-life scene in its entirety.

20. The system of claim 16, wherein at least a portion of the multiple 3D volumes are substantially aligned along at least one line projecting into the real-life scene from at least one 3D point relative to one or more of the plurality of cameras.

21. The system of claim 16, wherein at least a portion of the multiple 3D volumes are substantially aligned along a plurality of lines projecting into the real-life scene from at least one 3D point relative to one or more of the plurality of cameras.

22. The system of claim 16, wherein one or more of the 3D volumes are one or more 3D neighborhoods, wherein data collected within at least a portion of the multiple 3D volumes is used to determine the likelihood that the physical surface is at least partially contained within the one or more 3D neighborhoods.

* * * * *